United States Patent
Tabata et al.

(10) Patent No.: US 11,370,410 B2
(45) Date of Patent: Jun. 28, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 16/925,422

(22) Filed: Jul. 10, 2020

(65) Prior Publication Data

US 2021/0078563 A1 Mar. 18, 2021

(30) Foreign Application Priority Data

Sep. 12, 2019 (JP) .............................. JP2019-166680

(51) Int. Cl.
*B60W 20/10* (2016.01)
*B60W 10/08* (2006.01)
*B60W 10/06* (2006.01)

(52) U.S. Cl.
CPC ............ *B60W 20/10* (2013.01); *B60W 10/06* (2013.01); *B60W 10/08* (2013.01)

(58) Field of Classification Search
CPC ...... B60W 20/10; B60W 10/06; B60W 10/08; B60W 2510/0671; B60W 2540/10; B60W 2710/0644; B60W 2710/083; B60W 20/40; B60K 6/387; B60K 6/547; B60K 2006/381; B60K 6/365; B60K 6/383
See application file for complete search history.

(56) References Cited

U.S. PATENT DOCUMENTS

| | | | | |
|---|---|---|---|---|
| 2007/0125083 A1* | 6/2007 | Rollinger | .............. | B60W 10/30 123/565 |
| 2013/0054063 A1* | 2/2013 | Maier | ...................... | B60K 6/52 180/65.265 |
| 2015/0027407 A1* | 1/2015 | Darnell | ............... | H01M 10/425 123/399 |
| 2017/0122190 A1* | 5/2017 | Sanchez Perez | ....... | F02B 37/10 |

FOREIGN PATENT DOCUMENTS

| | | | | |
|---|---|---|---|---|
| GB | 2502081 A | * | 11/2013 | ............ B60W 10/06 |
| JP | 2008-095669 A | | 4/2008 | |
| JP | 2008-222033 A | | 9/2008 | |
| JP | 2015-150974 A | | 8/2015 | |
| JP | 2015193336 A | * | 11/2015 | ............ B60W 10/06 |

* cited by examiner

*Primary Examiner* — George C Jin
(74) *Attorney, Agent, or Firm* — Oblon, McClelland, Maier & Neustadt, L.L.P.

(57) ABSTRACT

When a travel mode in which an engine is not used as a drive power source for travel is switched to a travel mode in which the engine is used as a drive power source for travel in response to an acceleration request from a driver, it is determined whether an assist torque which is able to be output from a second rotary machine is sufficient for a required assist torque for compensating for an output shortage of the engine due to a supercharging response delay in a supercharger. When it is determined that the assist torque is not sufficient for the required assist torque, an engine rotation speed is increased to a predetermined target rotation speed by an MG1 torque of a first rotary machine.

5 Claims, 9 Drawing Sheets

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

*FIG. 13*

| TRAVEL MODE | | | | C1 | B1 | MG1 | MG2 |
|---|---|---|---|---|---|---|---|
| EV | FORWARD/ REVERSE | SINGLE- MOTOR DRIVE | DRIVE | | | G | M |
| | | | USE IN COMBINATION WITH ENGINE BRAKE | △ | △ | G | M |
| | | DOUBLE-MOTOR-DRIVEN DRIVE | | ○ | ○ | M | M |
| HV | FORWARD | HIGH | | | ○ | G | M |
| | | LOW | | ○ | | G | M |
| | REVERSE | LOW | | ○ | | G | M |

CONTROL DEVICE FOR HYBRID VEHICLE

CROSS-REFERENCE TO RELATED APPLICATION

This application claims priority to Japanese Patent Application No. 2019-166680 filed on Sep. 12, 2019, incorporated herein by reference in its entirety.

BACKGROUND

1. Technical Field

The disclosure relates to a control device for a hybrid vehicle that includes an engine with a supercharger and a rotary machine and uses power which is output from the engine and the rotary machine as drive power for travel.

2. Description of Related Art

A hybrid vehicle that includes an engine and a rotary machine and uses power which is output from the engine and the rotary machine as drive power for travel is known. For example, a control device for a hybrid vehicle is described in Japanese Unexamined Patent Application Publication No. 2015-150974 (JP 2015-150974 A). JP 2015-150974 A discloses that, when an acceleration request is issued at a low accelerator opening, an output shortage of the engine due to a supercharging response delay in a supercharger is compensated for by torque assist control using the rotary machine.

SUMMARY

In the hybrid vehicle described in JP 2015-150974 A, when the engine is started in an EV travel mode in which only the rotary machine is used as a drive power source for travel with an acceleration request from a driver and an assist torque which is able to be output from the rotary machine is short for a required assist torque for compensating for an output shortage of the engine due to a supercharging response delay, acceleration responsiveness may decrease due to the assist torque shortage.

The disclosure provides a control device for a hybrid vehicle that can curb a decrease in acceleration responsiveness when a travel mode in which an engine is not used as a drive power source for travel is switched to a travel mode in which the engine is used as a drive power source for travel with an acceleration request from a driver.

According to a first aspect of the disclosure, there is provided a control device for a hybrid vehicle including an engine with a supercharger and a rotary machine and using power which is output from the engine and the rotary machine as drive power for travel, the control device including: (a) a torque assist control unit configured to cause the rotary machine to output a required assist torque for compensating for an output shortage of the engine due to a supercharging response delay in the supercharger when a travel mode is switched from a first travel mode in which the engine is not used as a drive power source for travel to a second travel mode in which at least the engine is used as a drive power source for travel in response to an acceleration request from a driver; (b) a state determining unit configured to determine whether an assist torque which is able to be output from the rotary machine is sufficient for the required assist torque; and (c) a rotation speed increasing unit configured to increase a rotation speed of the engine to a predetermined target rotation speed before the first travel mode is switched to the second travel mode when the state determining unit determines that the assist torque which is able to be output from the rotary machine is not sufficient for the required assist torque during travel in the first travel mode.

A second aspect of the disclosure provides the control device for a hybrid vehicle according to the first aspect, further including a target rotation speed setting unit configured to set the target rotation speed, wherein the target rotation speed setting unit is configured to set the target rotation speed to a greater value when an intake-pipe pressure of the engine is low than when the intake-pipe pressure is high based on the intake-pipe pressure.

A third aspect of the disclosure provides the control device for a hybrid vehicle according to the first or second aspect, further including a target rotation speed setting unit configured to set the target rotation speed, wherein the target rotation speed setting unit is configured to set the target rotation speed to a greater value when an acceleration request level from the driver is great than when the acceleration request level is small based on the acceleration request level.

A fourth aspect of the disclosure provides the control device for a hybrid vehicle according to any one of the first to third aspects, further including a target rotation speed setting unit configured to set the target rotation speed, wherein the target rotation speed setting unit is configured to set the target rotation speed to a greater value when a degree of shortage of the assist torque which is able to be output from the rotary machine for the required assist torque is great than when the degree of shortage is small based on the degree of shortage.

A fifth aspect of the disclosure provides the control device for a hybrid vehicle according to any one of the first to fourth aspects, (a) wherein the state determining unit is configured to further determine whether a braking operation is performed by the driver, and (b) wherein the rotation speed increasing unit is configured to increase the rotation speed of the engine to the target rotation speed when the state determining unit determines that the braking operation is not performed by the driver.

The control device for a hybrid vehicle according to the first aspect includes: (a) a torque assist control unit configured to cause the rotary machine to output a required assist torque for compensating for an output shortage of the engine due to a supercharging response delay in the supercharger when a travel mode is switched from a first travel mode in which the engine is not used as a drive power source for travel to a second travel mode in which at least the engine is used as a drive power source for travel in response to an acceleration request from a driver; (b) a state determining unit configured to determine whether an assist torque which is able to be output from the rotary machine is sufficient for the required assist torque; and (c) a rotation speed increasing unit configured to increase a rotation speed of the engine to a predetermined target rotation speed before the first travel mode is switched to the second travel mode when the state determining unit determines that the assist torque which is able to be output from the rotary machine is not sufficient for the required assist torque during travel in the first travel mode. Accordingly, since the rotation speed of the engine is increased to the predetermined target rotation speed before the first travel mode is switched to the second travel mode, it is possible to curb a supercharging response delay in the supercharger and to curb a decrease in acceleration responsiveness due to a shortage of an assist torque when the assist torque which is able to be output from the rotary machine is not sufficient for the required assist torque.

The control device for a hybrid vehicle according to the second aspect further includes a target rotation speed setting unit configured to set the target rotation speed, and the target rotation speed setting unit is configured to set the target rotation speed to a greater value when an intake-pipe pressure of the engine is low than when the intake-pipe pressure is high based on the intake-pipe pressure. Since the supercharging response delay when the engine is started is more likely to increase when the intake-pipe pressure is low than when the intake-pipe pressure is high, there is a high degree of necessity to curb the supercharging response delay. By setting the predetermined target rotation speed to a higher value when the intake-pipe pressure is low than when the intake-pipe pressure is high, the supercharging response delay is curbed according to the degree of necessity to curb the supercharging response delay and thus it is possible to prevent an unnecessary increase of the rotation speed of the engine.

The control device for a hybrid vehicle according to the third aspect further includes a target rotation speed setting unit configured to set the target rotation speed, and the target rotation speed setting unit is configured to set the target rotation speed to a greater value when an acceleration request level from the driver is great than when the acceleration request level is small based on the acceleration request level. Since the driver is considered to require more rapid acceleration when the acceleration request level from the driver is high than when the acceleration request level is low, there is a high degree of necessity to curb the supercharging response delay. By setting the predetermined target rotation speed to a higher value when the acceleration request level is high than when the acceleration request level is low, the supercharging response delay is curbed according to the degree of necessity to curb the supercharging response delay and thus it is possible to prevent an unnecessary increase of the rotation speed of the engine.

The control device for a hybrid vehicle according to the fourth aspect further includes a target rotation speed setting unit configured to set the target rotation speed, and the target rotation speed setting unit is configured to set the target rotation speed to a greater value when a degree of shortage of the assist torque which is able to be output from the rotary machine for the required assist torque is great than when the degree of shortage is small based on the degree of shortage. When the degree of shortage is high, the degree of necessity to curb the supercharging response delay is higher than when the degree of shortage is low. By setting the predetermined target rotation speed to a higher value when the degree of shortage is high than when the degree of shortage is low, the supercharging response delay is curbed according to the degree of necessity to curb the supercharging response delay and thus it is possible to prevent an unnecessary increase of the rotation speed of the engine.

In the control device for a hybrid vehicle according to the fifth aspect, (a) the state determining unit is configured to further determine whether a braking operation is performed by the driver, and (b) the rotation speed increasing unit is configured to increase the rotation speed of the engine to the target rotation speed when the state determining unit determines that the braking operation is not performed by the driver. When a braking operation is performed, the engine is not started. Accordingly, it is possible to prevent an unnecessary increase of the rotation speed of the engine in a state in which the engine is not started.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13 is an engagement operation table illustrating a relationship between travel modes and combinations of operating states of a clutch and a brake which are used therein.

DETAILED DESCRIPTION OF EMBODIMENTS

Hereinafter, embodiments of the disclosure will be described in detail with reference to the accompanying drawings. In the following embodiments, the drawings are appropriately simplified or modified, and dimensional ratios, shapes, and the like of constituent elements are not necessarily accurate.

Figure 1:
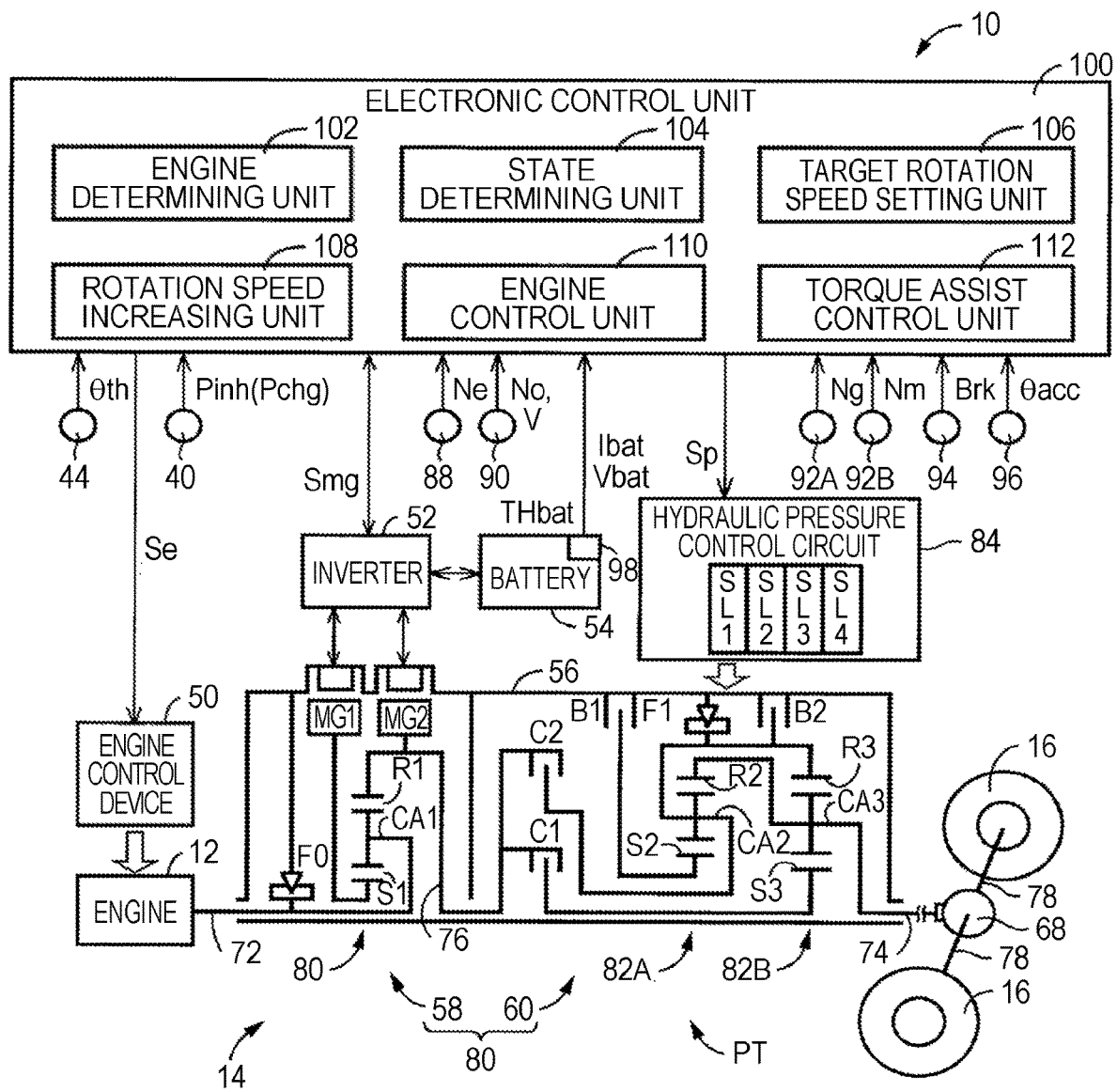
FIG. 1 is a functional block diagram schematically illustrating a configuration of a vehicle in which an electronic control unit according to a first embodiment of the disclosure is mounted and illustrating a principal part of a control function for various types of control in the vehicle.

FIG. 1 is a diagram schematically illustrating a configuration of a hybrid vehicle 10 in which an electronic control unit 100 according to a first embodiment of the disclosure is mounted and illustrating a principal part of a control function for various types of control in the hybrid vehicle 10. The hybrid vehicle 10 (hereinafter referred to as a "vehicle 10") includes an engine 12, a first rotary machine MG1, a second rotary machine MG2, a power transmission device 14, and driving wheels 16.

Figure 2:
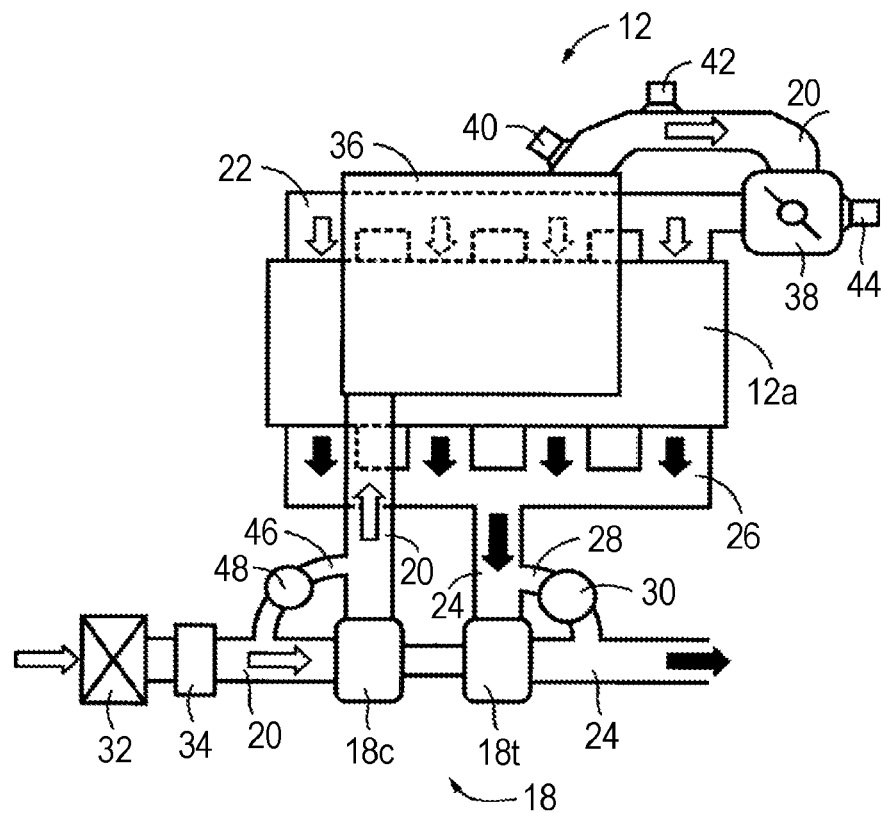
FIG. 2 is a diagram schematically illustrating a configuration of an engine illustrated in FIG. 1.

FIG. 2 is a diagram schematically illustrating a configuration of the engine 12. The engine 12 is a drive power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t. The compressor 18c is rotationally driven by the turbine 18t to compress air suctioned into the engine 12, that is, intake air.

An exhaust bypass 28 that causes exhaust gas to flow from upstream to downstream with respect to the turbine 18t by bypassing the turbine 18t is provided in the exhaust pipe 24. A waste gate valve 30 (hereinafter referred to as "WGV 30") that continuously controls a ratio of exhaust gas passing through the exhaust bypass 28 to exhaust gas passing through the turbine 18t is provided in the exhaust bypass 28. A valve opening of the WGV 30 is continuously adjusted by causing the electronic control unit 100 which will be described later to operate an actuator which is not illustrated. As the valve opening of the WGV 30 increases, exhaust gas of the engine 12 is more likely to be discharged via the exhaust bypass 28. Accordingly, in a supercharged state of the engine 12 in which a supercharging operation of the supercharger 18 works, a supercharging pressure Pchg [Pa] from the supercharger 18 decreases as the valve opening of the WGV 30 increases. The supercharging pressure Pchg from the supercharger 18 is a pressure of intake air and is an air pressure downstream from the compressor 18c in the intake pipe 20. A side on which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing an electronic control unit 100 which will be described later to operate a throttle actuator which is not illustrated is provided in the intake pipe 20 downstream from the intercooler 36 and upstream from the intake manifold 22. A supercharging pressure sensor 40 that detects an intake-pipe pressure Pinh [Pa] downstream from the compressor 18c and an intake air temperature sensor 42 that detects an intake air temperature Tinh which is the temperature of intake air are provided in the intake pipe 20 between the intercooler 36 and the electronic throttle valve 38. A throttle valve opening sensor 44 that detects a throttle valve opening θth [%] which is an opening of the electronic throttle valve 38 is provided in the vicinity of the electronic throttle valve 38, for example, in the throttle actuator.

An air recirculation bypass 46 that causes air to flow from downstream to upstream with respect to the compressor 18c by bypassing the compressor 18c is provided in the intake pipe 20. For example, an air bypass valve 48 that is opened to curb occurrence of a surge and to protect the compressor 18c at the time of sudden closing of the electronic throttle valve 38 is provided in the air recirculation bypass 46.

In the engine 12, an engine torque Te [Nm] which is output from the engine 12 is controlled by causing the electronic control unit 100 which will be described later to control an engine control device 50 (see FIG. 1) including, for example, the electronic throttle valve 38, a fuel injection device, an ignition device, and the WGV 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as drive power sources for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg [Nm] which is output from the first rotary machine MG1 and an MG2 torque Tm [Nm] which is output from the second rotary machine MG2 are controlled by causing the electronic control unit 100 which will be described later to control the inverter 52. For example, in the case of forward rotation, a torque which is output from a rotary machine is a powering torque on a positive torque side which is an acceleration side and is a regenerative torque on a negative torque side which is a deceleration side. When the MG1 torque Tg and the MG2 torque Tm which are output from the first rotary machine MG1 and the second rotary machine MG2 are powering torques, power (which is synonymous with drive power or a torque when particularly not distinguished) which is output from the first rotary machine MG1 and the second rotary machine MG2 is drive power for travel. The battery 54 transmits and receives electric power to and from the first rotary machine MG1 and the second rotary machine MG2. The battery 54 is a chargeable/dischargeable secondary battery such as a lithium-ion battery pack or a nickel-hydride battery pack. The first rotary machine MG1 and the second rotary machine MG2 are provided in a case 56 which is a non-rotary member attached to the vehicle body.

The power transmission device 14 includes, for example, an electrical stepless gear shifting unit 58 and a mechanical stepped gear shifting unit 60 which are disposed in series on a common axis in a case 56 which is a non-rotary member attached to the vehicle body. The stepless gear shifting unit 58 is connected to the engine 12 directly or indirectly via a damper or the like which is not illustrated. The stepped gear shifting unit 60 is connected to an output side of the stepless gear shifting unit 58. The power transmission device 14 includes, for example, a differential gear 68 that is connected to an output shaft 74 which is an output rotary member of the stepped gear shifting unit 60 and a pair of axles 78 that is connected to the differential gear 68. In the power transmission device 14, power which is output from the engine 12 or the second rotary machine MG2 is transmitted to the stepped gear shifting unit 60. The power transmitted to the stepped gear shifting unit 60 is transmitted to the driving wheels 16 via the differential gear 68 or the like. The power transmission device 14 having this configuration is suitably used for a vehicle of a front-engine rear-drive (FR) type. The stepless gear shifting unit 58, the stepped gear shifting unit 60, or the like is disposed to be substantially symmetric with respect to the common axis, and a lower half with respect to the axis is not illustrated in FIG. 1. The common axis is an axis of a crankshaft of the engine 12, an input shaft 72 connected to the crankshaft, or the like. The stepless gear shifting unit 58, the stepped gear shifting unit 60, the differential gear 68, and the axles 78 in the power transmission device 14 constitute the power transmission path PT which is provided between the engine 12 and the driving wheels 16.

The stepless gear shifting unit 58 includes a differential mechanism 80 which is a power split mechanism that mechanically splits power of the engine 12 to the first rotary machine MG1 and the intermediate transmission member 76 which is an output rotary member of the stepless gear shifting unit 58. The first rotary machine MG1 is a rotary machine to which the power of the engine 12 is transmitted. The second rotary machine MG2 is connected to the intermediate transmission member 76 in a power-transmittable manner. Since the intermediate transmission member 76 is connected to the driving wheels 16 via the stepped gear shifting unit 60, the second rotary machine MG2 is connected to the power transmission path PT in a power-transmittable manner and the second rotary machine MG2 is a rotary machine that is connected to the driving wheels 16 in a power-transmittable manner. The differential mechanism 80 is a differential mechanism that splits and transmits the power of the engine 12 to the driving wheels 16 and the first rotary machine MG1. The stepless gear shifting unit 58 is an electrical stepless transmission in which a differential state of the differential mechanism 80 (that is, a differential state of the stepless gear shifting unit 58) is controlled by controlling the operating state of the first rotary machine MG1 which is connected to the differential mechanism 80 in a power-transmittable manner. The first rotary machine MG1 is a rotary machine that can control an engine rotation speed Ne [rpm]. The engine rotation speed Ne is a rotation speed of the engine 12.

The differential mechanism 80 is a known single-pinion type planetary gear device including a sun gear S1, a carrier CA1, and a ring gear R1.

The stepped gear shifting unit 60 is a mechanical gear shifting mechanism which is a stepped transmission constituting a part of the power transmission path PT between the intermediate transmission member 76 and the driving wheels 16, that is, an automatic transmission constituting a part of the power transmission path PT between the differential mechanism 80 and the driving wheels 16. The intermediate transmission member 76 also serves as an input rotary member of the stepped gear shifting unit 60. The stepped gear shifting unit 60 is, for example, a known planetary gear type automatic transmission including a plurality of planetary gear units such as a first planetary gear unit 82A and a second planetary gear unit 82B and a plurality of engagement devices such as a clutch C1, a clutch C2, a brake B1, a brake B2, and a one-way clutch F1. In the following description, the clutch C1, the clutch C2, the brake B1, and the brake B2 are simply referred to as engagement devices CB when not particularly distinguished from each other.

Each engagement device CB is a hydraulic frictional engagement device which is constituted by a multi-disc or single-disc clutch or brake which is pressed by a hydraulic actuator, a band brake which is tightened by a hydraulic actuator, or the like. In each engagement device CB, the operating state such as an engaged state or a disengaged state thereof is switched according to adjusted hydraulic pressures which are output from a hydraulic pressure control circuit 84 by causing the electronic control unit 100 which will be described later to control the hydraulic pressure control circuit 84 which is provided in the vehicle 10.

The first planetary gear unit 82A is a known single-pinion type planetary gear unit that includes a sun gear S2, a carrier CA2, and a ring gear R2. The second planetary gear unit 82B is a known single-pinion type planetary gear unit that includes a sun gear S3, a carrier CA3, and a ring gear R3.

The differential mechanism 80, the first planetary gear unit 82A, the second planetary gear unit 82B, the engagement devices CB, the one-way clutch F1, the first rotary machine MG1, and the second rotary machine MG2 are connected as illustrated in FIG. 1. In the differential mechanism 80, the carrier CA1 serves as an input element, the sun gear S1 serves as a reaction element, and the ring gear R1 serves as an output element.

Each engagement device CB is a hydraulic frictional engagement device. In each engagement device CB, an engagement torque which is a torque capacity of the corresponding engagement device CB is changed according to adjusted hydraulic pressures which are output from solenoid valves SL1 to SL4 in the hydraulic pressure control circuit 84 which is provided in the vehicle 10. Accordingly, the operating state such as an engaged state or a disengaged state of each engagement device CB is switched.

In the stepped gear shifting unit 60, a certain gear stage out of a plurality of gear stages with different gear ratios γat (=AT input rotation speed Nati [rpm]/AT output rotation speed Nato [rpm]) is formed, by switching a combination of the operating states of the plurality of engagement devices CB. In this embodiment, a gear stage which is formed in the stepped gear shifting unit 60 is referred to as an AT gear stage. The AT input rotation speed Nati is an input rotation speed of the stepped gear shifting unit 60 and has the same value as the rotation speed of the intermediate transmission member 76 and the same value as an MG2 rotation speed Nm [rpm]. The AT output rotation speed Nato is a rotation speed of the output shaft 74 which is an output rotary member of the stepped gear shifting unit 60 and is also an output rotation speed No of a composite transmission 62 which is a combined transmission including the stepless gear shifting unit 58 and the stepped gear shifting unit 60.

Figure 3:
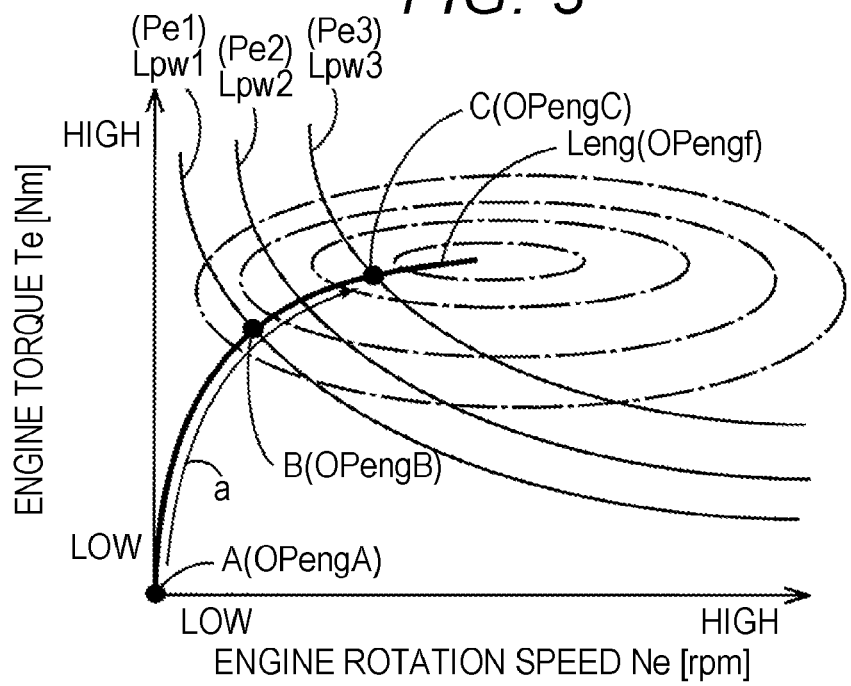
FIG. 3 is a diagram illustrating an example of an optimal engine operating point in a two-dimensional coordinate system with an engine rotation speed and an engine torque as variables.

FIG. 3 is a diagram illustrating an example of optimal engine operating points OPengf in a two-dimensional coordinate system with the engine rotation speed Ne and the engine torque Te as variables. In FIG. 3, a maximum efficiency line Leng denotes a group of optimal engine operating points OPengf when the engine 12 operates. An optimal engine operating point OPengf is predetermined as an engine operating point OPeng at which total fuel efficiency in the vehicle 10 is the best in consideration of charging/discharging efficiency in the battery 54 in addition to fuel efficiency of the engine 12 alone, for example, when required engine power Pedem [W] is realized. That is, the engine rotation speed Ne at an optimal engine operating point OPengf is an optimal fuel-efficiency rotation speed Neeff at which the engine 12 can most efficiently output the required engine power Pedem.

Equi-engine-power lines Lpw1, Lpw2, and Lpw3 denote examples in which the required engine power Pedem is engine power Pe1, Pe2, and Pe3, respectively. A point A is an engine operating point OPengA on the optimal engine operating points OPengf when an engine power Pe [W] is zero, that is, when operation of the engine 12 is stopped, a point B is an engine operating point OPengB when the engine power Pe1 is realized on the optimal engine operating points OPengf, and a point C is an engine operating point OPengC when the engine power Pe3 is realized on the optimal engine operating points OPengf. The points other than the point A on the optimal engine operating points OPengf are target values of the engine operating point OPeng which is expressed by a target engine rotation speed Netgt [rpm] and a target engine torque Tetgt [Nm], that is, target engine operating points OPengtgt, when the engine 12 is operating. That is, the target engine rotation speed Netgt is a target value of the engine rotation speed Ne when the engine 12 is operating, and the target engine power Tetgt is a target value of the engine torque Te when the engine 12 is operating. The engine power Pe is power (which is synonymous with drive power or a torque when particularly not distinguished) which is output from the engine 12 and is drive power for travel which is output from the engine 12.

For example, when the target engine operating point OPengtgt changes from the point A to the point C with an increase in an accelerator opening θacc [%] (for example, an increase in the accelerator opening θacc in a force of depression of an accelerator pedal, which is not illustrated, by a driver), the engine operating point OPeng changes on a path a which passes over the maximum efficiency line Leng.

Although not illustrated in FIG. 3, strictly, the optimal engine operating points OPengf at which the fuel efficiency is the highest in the engine 12 with the supercharger 18 are stored in advance with a supercharging pressure Pchg in addition to the engine rotation speed Ne and the engine torque Te as variables. The supercharging pressure Pchg when the required engine power Pedem is realized at the optimal engine operating point OPengf is a target supercharging pressure Pchgtgt [Pa].

Figures 4, 5:
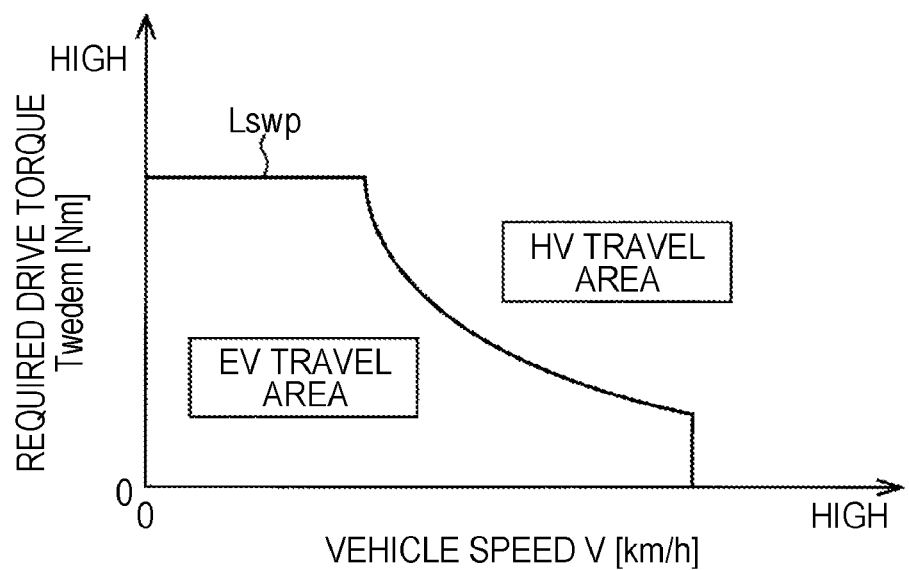
FIG. 4 is a diagram illustrating an example of a power source switching map which is used for switching control between EV travel and HV travel.
FIG. 5 is an engagement operation table illustrating a relationship between a gear shifting operation of a stepped gear shifting unit illustrated in FIG. 1 and a combination of operating states of engagement devices which are used therein.

FIG. 4 is a diagram illustrating an example of a power source switching map which is used for switching control between EV travel and HV travel. In FIG. 4, a solid line Lswp is a boundary line between an EV travel area and an HV travel area at which switching between the EV travel and the HV travel is performed. An area in which a vehicle speed V [km/h] is relatively low and a required drive torque Twdem [Nm] is relatively low (that is, required drive power Pwdem [N] is relatively small) is defined in advance in the EV travel area. An area in which the vehicle speed V is relatively high and the required drive torque Twdem is relatively high (that is, the required drive power Pwdem is relatively great) is defined in advance in the HV travel area. When a state of charge value SOC [%] of the battery 54 which will be described later is less than a predetermined state value or when warming-up of the engine 12 is necessary, the EV travel area in FIG. 4 may be changed to the HV travel area. The predetermined state value is a predetermined threshold value for determining that the state of charge value SOC is a value at which the engine 12 needs to be forcibly started to charge the battery 54.

The first rotary machine MG1 and the second rotary machine MG2 are connected to the battery 54 provided in the vehicle 10 via an inverter 52 which is provided in the vehicle 10. The MG1 torque Tg of the first rotary machine MG1 and the MG2 torque Tm of the second rotary machine MG2 are controlled by causing the electronic control unit 100 which will be described later to control the inverter 52.

FIG. 5 is an engagement operation table illustrating a relationship between a gear shifting operation of the stepped gear shifting unit 60 illustrated in FIG. 1 and a combination of operating states of the engagement devices CB which are used therein. In the stepped gear shifting unit 60, for example, four AT gear stages for forward movement including a first AT gear stage ("1st" in FIG. 5) to a fourth AT gear stage ("4th" in FIG. 5) are formed as a plurality of AT gear stages. The gear ratio γat of the first AT gear stage is the highest and the gear ratio γat becomes lower in higher AT gear stages. An AT gear stage for reverse movement ("Rev" in FIG. 5) is formed, for example, by engagement of the clutch C1 and engagement of the brake B2. That is, for example, the first AT gear stage is formed at the time of reverse travel as will be described later. In FIG. 5, "O" denotes engagement, "Δ" denotes engagement at the time of engine braking or at the time of coast downshift of the stepped gear shifting unit 60, and a blank denotes disengagement. A coast downshift is, for example, a downshift which is performed in a decelerating travel state with an accelerator turned off out of downshifts which are performed due to a decrease in the vehicle speed V during decelerating travel with the accelerator turned off (the accelerator opening θacc is 0 or substantially 0).

In the stepped gear shifting unit 60, for example, an AT gear stage which is formed according to the accelerator opening θacc which is an amount of operation of an accelerator by a driver, the vehicle speed V, or the like is switched, that is, a plurality of AT gear stages is selectively formed, by the electronic control unit 100 which will be described later. For example, in gear shifting control of the stepped gear shifting unit 60, so-called clutch-to-clutch gear shifting in which gear shifting is performed by switching one of the engagement devices CB, that is, gear shifting is performed by switching of the engagement devices CB between engagement and disengagement, is performed.

The vehicle 10 additionally includes a one-way clutch F0 (see FIG. 1). The one-way clutch F0 is a lock mechanism that can fix the carrier CA1 to be non-rotatable. That is, the one-way clutch F0 is a lock mechanism that can fix an input shaft 72 which is connected to the crankshaft of the engine 12 and which rotates integrally with the carrier CA1 to the case 56. In the one-way clutch F0, one member of two members that are rotatable relative to each other is integrally connected to the input shaft 72 and the other member is integrally connected to the case 56. The one-way clutch F0 idles in a positive rotating direction which is a rotating direction at the time of operation of the engine 12 and is automatically engaged in a negative rotating direction which is opposite to that at the time of operation of the engine 12. Accordingly, when the one-way clutch F0 idles, the engine 12 is rotatable relative to the case 56. On the other hand, when the one-way clutch F0 is engaged, the engine 12 is not rotatable relative to the case 56. That is, the engine 12 is fixed to the case 56 by engagement of the one-way clutch F0. In this way, the one-way clutch F0 permits rotation in the positive rotating direction of the carrier CA1 which is a rotating direction at the time of operation of the engine 12 and prohibits rotation in the negative rotating direction of the carrier CA1. That is, the one-way clutch F0 is a lock mechanism that can permit rotation in the positive rotating direction of the engine 12 and prohibit rotation in the negative rotating direction of the engine 12.

Figure 6:
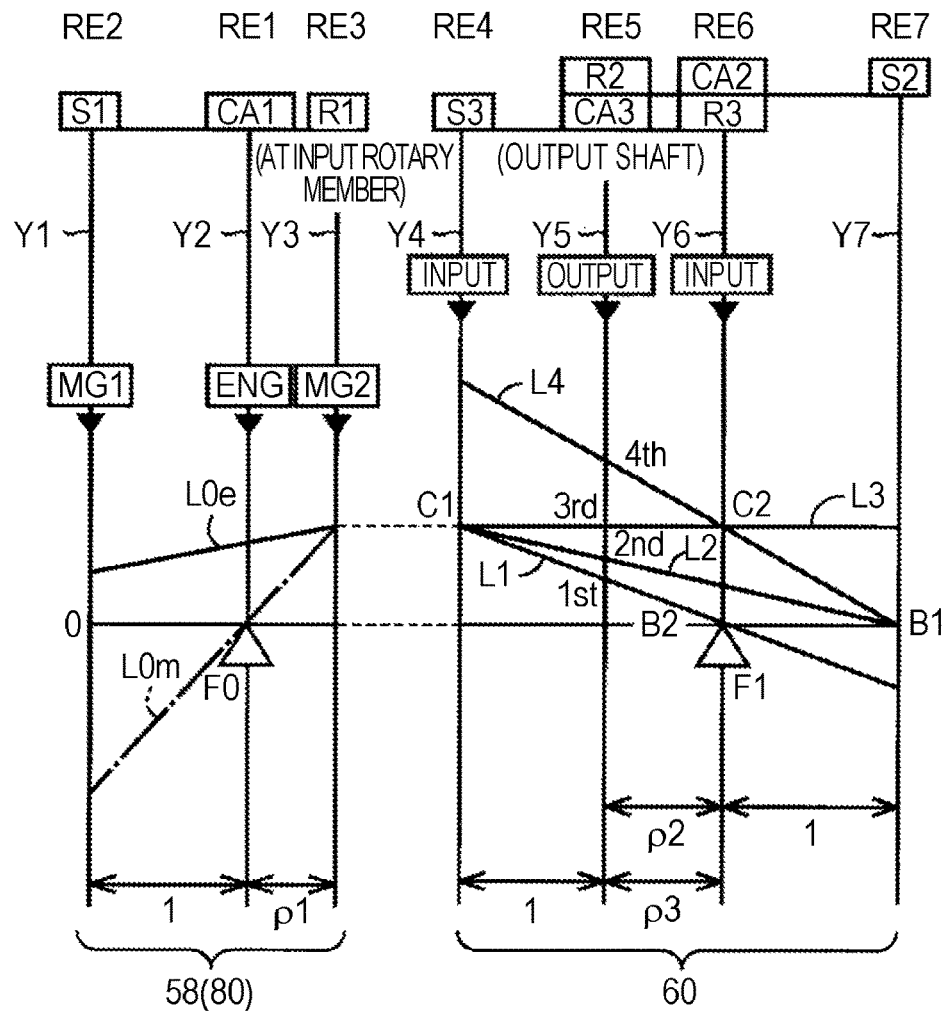
FIG. 6 is a collinear diagram illustrating a relative relationship between rotation speeds of rotary elements in a stepless gear shifting unit and a stepped gear shifting unit illustrated in FIG. 1.

FIG. 6 is a collinear diagram illustrating a relative relationship between rotation speeds of the rotary elements in the stepless gear shifting unit 58 and the stepped gear shifting unit 60 which are illustrated in FIG. 1. In FIG. 6, three vertical lines Y1, Y2, and Y3 corresponding to three rotary elements of the differential mechanism 80 constituting the stepless gear shifting unit 58 are axes indicating the rotation speed of the sun gear S1 corresponding to a second rotary element RE2, the rotation speed of the carrier CA1 corresponding to a first rotary element RE1, and the rotation speed of the ring gear R1 (that is, the input rotation speed of the stepped gear shifting unit 60) corresponding to a third rotary element RE3, respectively, sequentially from the left. Four vertical lines Y4, Y5, Y6, and Y7 of the stepped gear shifting unit 60 are axes indicating the rotation speed of the sun gear S3 corresponding to a fourth rotary element RE4, the rotation speed of the ring gear R2 and the carrier CA3 (that is, the rotation speed of the output shaft 74) connected to each other and corresponding to a fifth rotary element RE5, the rotation speed of the carrier CA2 and the ring gear R3 connected to each other and corresponding to a sixth rotary element RE6, and the rotation speed of the sun gear S2 corresponding to a seventh rotary element RE7, respectively, sequentially from the left. The gaps between the vertical lines Y1, Y2, and Y3 are determined according to a gear ratio $\rho1$ of the differential mechanism 80 (=number of teeth of the sun gear S1/number of teeth of the ring gear R1). The gaps between the vertical lines Y4, Y5, Y6, and Y7 are determined according to gear ratios $\rho2$ (=number of teeth of the sun gear S2/number of teeth of the ring gear R2) and $\rho3$ (=number of teeth of the sun gear S3/number of teeth of the ring gear R3) of the first planetary gear unit 82A and the second planetary gear unit 82B.

Referring to the collinear diagram illustrated in FIG. 6, in the differential mechanism 80 of the stepless gear shifting unit 58, the engine 12 (see "ENG" in FIG. 6) is connected to the first rotary element RE1, the first rotary machine MG1 (see "MG1" in FIG. 6) is connected to the second rotary element RE2, the second rotary machine MG2 (see "MG2" in FIG. 6) is connected to the third rotary element RE3 which rotates integrally with the intermediate transmission member 76, and rotation of the engine 12 is transmitted to the stepped gear shifting unit 60 via the intermediate transmission member 76. In the stepless gear shifting unit 58, a relationship between the rotation speed of the sun gear S1 and the rotation speed of the ring gear R1 is represented by straight lines L0e and L0m crossing the vertical line Y2.

In the stepped gear shifting unit 60, the fourth rotary element RE4 is selectively connected to the intermediate transmission member 76 via the clutch C1, the fifth rotary element RE5 is connected to the output shaft 74, the sixth rotary element RE6 is selectively connected to the intermediate transmission member 76 via the clutch C2 and selectively connected to the case 56 via the brake B2, and the seventh rotary element RE7 is selectively connected to the case 56 via the brake B1. In the stepped gear shifting unit 60, the rotation speeds of "1st," "2nd," "3rd," and "4th" in the output shaft 74 are represented by the straight lines L1, L2, L3, and L4 crossing the vertical line Y5 through engagement/disengagement control of the engagement devices CB.

The straight line L0e and the straight lines L1, L2, L3, and L4 which are indicated by solid lines in FIG. 6 denote relative speeds of the rotary elements at the time of forward travel in an HV travel mode with at least the engine 12 as a drive power source for travel. In the HV travel mode, the engine 12 is a main drive power source for travel, and the first rotary machine MG1 and the second rotary machine MG2 are auxiliary drive power sources for travel according to necessity. In the HV travel mode, in the differential mechanism 80, when a reaction torque which is a negative torque of the first rotary machine MG1 with respect to the engine torque Te input to the carrier CA1 is input to the sun gear S1 at the time of positive rotation, a direct engine-transmitted torque Td [Nm] $(=Te/(1+\rho1)=-(1/\rho1)\times Tg)$ which is a positive torque at the time of positive rotation appears in the ring gear R1. A combined torque of the direct engine-transmitted torque Td and the MG2 torque Tm is transmitted as a drive torque Tw in the forward moving direction of the vehicle 10 to the driving wheels 16 via the stepped gear shifting unit 60 in which one AT gear stage out of the first AT gear stage to the fourth AT gear stage is formed according to required drive power Pwdem. At this time, the first rotary machine MG1 serves as a power generator that generates a negative torque at the time of positive rotation. Generated electric power Wg of the first rotary machine MG1 is charged in the battery 54 or is consumed in the second rotary machine MG2. The second rotary machine MG2 outputs the MG2 torque Tm using all or some of the generated electric power Wg or electric power from the battery 54 in addition to the generated electric power Wg. The HV travel mode in this embodiment is a travel mode in which at least the engine 12 is used as a drive power source for travel and corresponds to a "second travel mode" in the claims.

The straight line L0m indicated by an alternate long and short dash line in FIG. 6 and the straight lines L1, L2, L3, and L4 indicated by solid lines in FIG. 6 denote relative speeds of the rotary elements at the time of forward travel in an EV travel mode using at least one rotary machine of the first rotary machine MG1 and the second rotary machine MG2 as a drive power source for travel in a state in which the operation of the engine 12 is stopped. The forward travel in the EV travel mode includes, for example, a single-motor-driven EV travel mode in which the engine 12 is not used as a drive power source for travel and only the second rotary machine MG2 is used as a drive power source for travel and a double-motor-driven EV travel mode in which the engine 12 is not used as a drive power source for travel and both the first rotary machine MG1 and the second rotary machine MG2 are used as drive power sources for travel. The second rotary machine MG2 corresponds to a "rotary machine" in the claims. The EV travel mode in this embodiment corresponds to a "first travel mode" in the claims.

In the single-motor-driven EV travel mode, the carrier CA1 does not rotate and the MG2 torque Tm which is a positive torque at the time of positive rotation is input to the ring gear R1. At this time, the first rotary machine MG1 connected to the sun gear S1 enters a no-load state and idles at the time of negative rotation. In the single-motor-driven EV travel mode, the one-way clutch F0 is disengaged and the input shaft 72 is not fixed to the case 56.

In the double-motor-driven EV travel mode, when the MG1 torque Tg which is a negative torque at the time of negative rotation is input to the sun gear S1 in a state in which the carrier CA1 does not rotate, the one-way clutch F0 is automatically engaged such that rotation in the negative rotating direction of the carrier CA1 is prohibited. In the state in which the carrier CA1 is fixed to be non-rotatable by engagement of the one-way clutch F0, a reaction torque based on the MG1 torque Tg is input to the ring gear R1. In the double-motor-driven EV travel mode, similarly to the single-motor-driven EV travel mode, the MG2 torque Tm is input to the ring gear R1.

At the time of forward travel in the single-motor-driven EV travel mode and the double-motor-driven EV travel mode, the engine 12 is not driven, the engine rotation speed Ne is zero, and at least one torque of the MG1 torque Tg and the MG2 torque Tm is transmitted to the driving wheels 16 via the stepped gear shifting unit 60 in which one AT gear stage out of the first AT gear stage to the fourth AT gear stage is formed as a drive torque in the forward travel direction of the vehicle 10. At the time of forward travel in the single-motor-driven EV travel mode and the double-motor-driven EV travel mode, the engine 12 is not driven, the MG1 torque Tg is a powering torque which is a negative torque at the time of negative rotation and the MG2 torque Tm is a powering torque which is a positive torque at the time of positive rotation.

In the HV travel mode, when the required drive power Pwdem which is required for the vehicle 10 changes, the target engine operating point OPengtgt for acquiring required engine power Pedem for realizing the required drive power Pwdem is set.

In the HV travel mode, when the rotation speed of the sun gear S1 is increased or decreased by controlling the rotation speed of the first rotary machine MG1 with respect to the rotation speed of the ring gear R1 which is constrained to rotation of the driving wheels 16 with formation of an AT gear stage in the stepped gear shifting unit 60, the rotation speed of the carrier CA1, that is, the engine rotation speed Ne, is increased or decreased. Accordingly, in the HV travel mode, the engine 12 can operate at an engine operating point Peng with high efficiency. The composite transmission 62 including the stepped gear shifting unit 60 in which an AT gear stage is formed and the stepless gear shifting unit 58 operating as a stepless transmission can constitute a stepless transmission.

Referring back to FIG. 1, the vehicle 10 includes the electronic control unit 100 serving as a controller including the control device for the vehicle 10 associated with control of the engine 12, the first rotary machine MG1, the second rotary machine MG2, and the like. The electronic control unit 100 is configured to include a so-called microcomputer including, for example, a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity. The electronic control unit 100 corresponds to a "control device" in the claims.

The electronic control unit 100 is supplied with various signals (for example, an intake-pipe pressure Pinh (a supercharging pressure Pchg when the engine 12 is operating and a residual pressure of the supercharging pressure Pchg when the operation of the engine 12 is stopped), a throttle valve opening θth, an engine rotation speed Ne, an output rotation speed No [rpm] which is the rotation speed of the output shaft 74 corresponding to a vehicle speed V, an MG1 rotation speed Ng [rpm] which is the rotation speed of the first rotary machine MG1, an MG2 rotation speed Nm which is the rotation speed of the second rotary machine MG2, a brake signal Brk indicating the presence of a braking operation by a driver, an accelerator opening θacc which is an accelerator operation amount indicating the magnitude of the driver's acceleration operation, and a battery temperature THbat [° C.], a battery charging/discharging current that [mA], or a battery voltage Vbat [V] of the battery 54) based on detection values from various sensors (for example, a supercharging pressure sensor 40, a throttle valve opening sensor 44, an engine rotation speed sensor 88, an output rotation speed sensor 90, an MG1 rotation speed sensor 92A, an MG2 rotation speed sensor 92B, a brake operation amount sensor 94, an accelerator opening sensor 96, and a battery sensor 98) which are provided in the vehicle 10. For example, when an amount of depression of a brake pedal which is not illustrated is less than a predetermined amount of operation, a braking operation is not performed by a driver and the brake signal Brk is in an OFF state. When the amount of depression of the brake pedal is equal to or greater than the predetermined amount of operation, the braking operation is performed by the driver and the brake signal Brk is in an ON state. The predetermined amount of operation is a threshold value of the amount of depression of the brake pedal for determining whether the vehicle 10 is to be braked and is acquired by experiment or design and stored in advance.

The electronic control unit 100 outputs various command signals (for example, an engine control command signal Se which is a command signal for controlling the engine 12, a rotary machine control command signal Smg which is a command signal for controlling the first rotary machine MG1 and the second rotary machine MG2, a hydraulic pressure control command signal Sp which is a command signal for controlling the operating states of the engagement devices CB) to various devices (for example, the engine control device 50, the inverter 52, and the hydraulic pressure control circuit 84) which are provided in the vehicle 10.

The electronic control unit 100 calculates a state of charge value SOC which is a value indicating the state of charge of the battery 54, for example, based on the battery charging/discharging current Ibat and the battery voltage Vbat. The electronic control unit 100 calculates chargeable electric power Win [W] and dischargeable electric power Wout [W] for defining a feasible range of battery electric power Pbat [W] which is the power of the battery 54, for example, based on the battery temperature Thb and the state of charge value SOC of the battery 54. The chargeable electric power Win and the dischargeable electric power Wout are set to curb deterioration of the battery 54. The chargeable electric power Win is possible input electric power for defining a limitation of charging electric power of the battery 54 and the dischargeable electric power Wout is possible output power for defining a limitation of discharging electric power [W] of the battery 54. Accordingly, in view of deterioration of the battery 54, it is not preferable for the charging electric power of the battery 54 to exceed the chargeable electric power Win for a long time or for the discharging electric power of the battery 54 to exceed the dischargeable electric power Wout for a long time. For example, the chargeable electric power Win and the dischargeable electric power Wout decrease as the battery temperature THbat decreases in a low-temperature area in which the battery temperature THbat is lower than that in a normal area, and decrease as the battery temperature THbat increases in a high-temperature area in which the battery temperature THbat is higher than that in the normal area. For example, the chargeable electric power Win decreases as the state of charge value SOC increases in an area in which the state of charge value SOC is high. For example, the dischargeable electric power Wout decreases as the state of charge value SOC decreases in an area in which the state of charge value SOC is low.

The electronic control unit 100 functionally includes an engine determining unit 102, a state determining unit 104, a target rotation speed setting unit 106, a rotation speed increasing unit 108, an engine control unit 110, and a torque assist control unit 112.

When the vehicle 10 is switched from an EV travel mode to an HV travel mode in response to an acceleration request from a driver, the engine determining unit 102 determines whether the operation of the engine 12 is stopped. In a state in which the operation of the engine 12 is stopped, an engine torque Te which is drive power for travel is not output from the engine 12 (the engine 12 is not yet started by the engine control device 50).

When the engine determining unit 102 determines that the operation of the engine 12 is stopped, the state determining unit 104 determines whether a braking operation is performed by the driver. For example, it is determined that a braking operation is performed by the driver when a brake signal Brk is in an ON state, and it is determined that a braking operation is not performed by the driver when the brake signal Brk is in an OFF state.

When the engine determining unit 102 determines that the operation of the engine 12 is stopped, the state determining unit 104 determines whether an assist torque Ta_poss [Nm] which can be output from the second rotary machine MG2 is sufficient for a required assist torque Ta_req [Nm]. The required assist torque Ta_req is an MG2 torque Tm of the second rotary machine MG2 which is required to compensate for an output shortage of the engine 12 due to a supercharging response delay in the supercharger 18 when the EV travel mode (a travel mode in which the engine 12 is not used as a drive power source for travel) is switched to the HV travel mode in which at least the engine 12 is used as a drive power source for travel in response to an acceleration request from the driver (that is, when the engine 12 is started). The required assist torque Ta_req is not limited to the MG2 torque Tm which is required to compensate for the overall output shortage of the engine 12, and may be an MG2 torque Tm which is required to compensate for a necessary part of the output shortage of the engine 12. The assist torque Ta_poss which can be output from the second rotary machine MG2 is estimated, for example, from dischargeable electric power Wout of the battery 54. Specifically, when the dischargeable electric power Wout is great, the assist torque Ta_poss which can be output from the second rotary machine MG2 is estimated to be greater than when the dischargeable electric power Wout is small. Accordingly, when the dischargeable electric power Wout is equal to or greater than a predetermined electric power value, it is determined that the assist torque Ta_poss which can be output from the second rotary machine MG2 is sufficient for the required assist torque Ta_req (that is, the assist torque Ta_poss is secured as much as necessary). When the dischargeable electric power Wout is less than the predetermined electric power value, it is determined that the assist torque Ta_poss which can be output from the second rotary machine MG2 is not sufficient for the required assist torque Ta_req (that is, the assist torque Ta_poss is not secured as much as necessary). The predetermined electric power value is a threshold value for the dischargeable electric power Wout for determining that the assist torque Ta_poss which can be output from the second rotary machine MG2 is sufficient for the required assist torque Ta_req and is calculated by experiment or design and stored in advance.

When the state determining unit 104 determines that the assist torque Ta_poss is not sufficient for the required assist torque Ta_req, the target rotation speed setting unit 106 sets a predetermined target rotation speed Net [rpm] which is a target value to which the engine rotation speed Ne is increased.

Responsiveness of the supercharging pressure Pchg when the engine 12 is started (a period of time until a supercharging effect is exhibited is short) is better when an intake-pipe pressure Pinh is high than when the intake-pipe pressure Pinh is low. The intake-pipe pressure Pinh is detected by, for example, the supercharging pressure sensor 40. When the intake-pipe pressure Pinh is low, a supercharging response delay when the engine 12 is started is more likely to increase than when the intake-pipe pressure Pinh is high and thus there is high necessity to curb the supercharging response delay.

Figure 7:
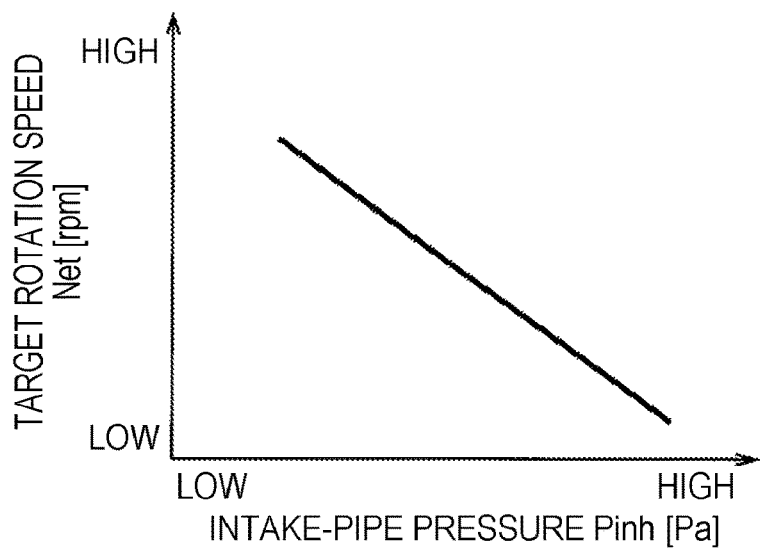
FIG. 7 is a diagram illustrating a relationship between an intake-pipe pressure and a predetermined target rotation speed.

FIG. 7 is a diagram illustrating a relationship between the intake-pipe pressure Pinh and the predetermined target rotation speed Net. The predetermined target rotation speed Net is set to a greater value when the intake-pipe pressure Pinh is low than when the intake-pipe pressure Pinh is high. This means that, when conditions other than the intake-pipe pressure Pinh are the same (for example, when an acceleration request level Dacc [%/ms] which will be described later or dischargeable electric power Wout is the same), the predetermined target rotation speed Net is set to a greater value when the intake-pipe pressure Pinh is low than when the intake-pipe pressure Pinh is high, but does not mean that, when conditions other than the intake-pipe pressure Pinh are different, the predetermined target rotation speed Net is necessarily set to a greater value when the intake-pipe pressure Pinh is low than when the intake-pipe pressure Pinh is high. In this way, the predetermined target rotation speed Net is set according to the degree of necessity to curb a supercharging response delay based on the intake-pipe pressure Pinh.

The acceleration request level Dacc is a magnitude of a request of a driver for acceleration responsiveness, for example, a rate of an operation of increasing a force of depression of an accelerator pedal which is operated by the driver, and is detected as a rate of increase of the accelerator opening θacc. For example, in the timing chart illustrated in FIG. 11 which will be described later, in a period from time t3 to time t5, an acceleration request of the driver is issued and the accelerator opening θacc increases, and the acceleration request level Dacc in this period is expressed by a ratio {=(θacc1−0)/(t5−t3)} of an increase of the accelerator opening θacc in the period (=θacc1−0) to the period in which the acceleration request is issued (=t5−t3). Since the driver is considered to require more rapid acceleration when the acceleration request level Dacc is great than when the acceleration request level Dacc is small, there is high necessity to curb a supercharging response delay.

Figure 8:
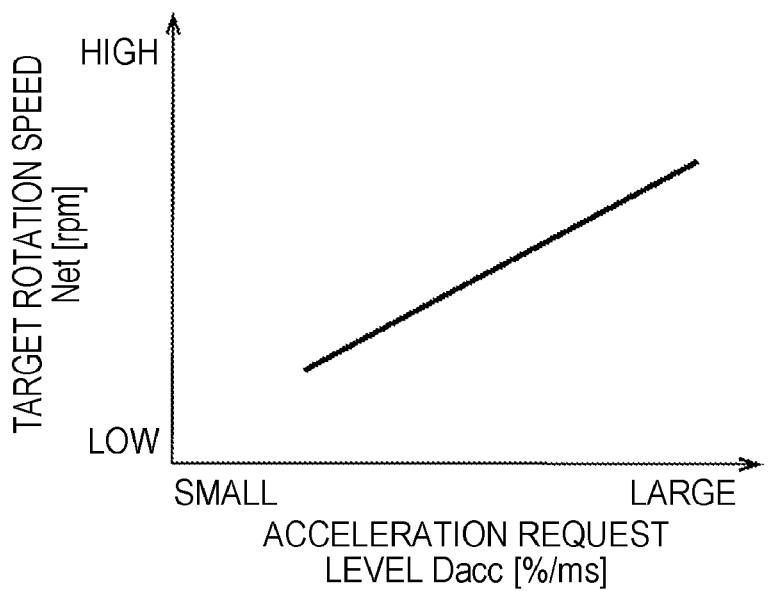
FIG. 8 is a diagram illustrating a relationship between a acceleration request level and the predetermined target rotation speed.

FIG. 8 is a diagram illustrating a relationship between the acceleration request level Dacc and the predetermined target rotation speed Net. The predetermined target rotation speed Net is set to a greater value when the acceleration request level Dacc is high than when the acceleration request level Dacc is low. This means that, when conditions other than the acceleration request level Dacc are the same (for example, when the intake-pipe pressure Pinh [%/ms] or dischargeable electric power Wout which will be described later is the same), the predetermined target rotation speed Net is set to a greater value when the acceleration request level Dacc is low than when the acceleration request level Dacc is high, but does not mean that, when conditions other than the acceleration request level Dacc are different, the predetermined target rotation speed Net is necessarily set to a greater value when the acceleration request level Dacc is high than when the acceleration request level Dacc is low. In this way, the predetermined target rotation speed Net is set according to the degree of necessity to curb a supercharging response delay based on the acceleration request level Dacc.

The necessity to curb a supercharging response delay when the engine 12 is started is higher when the degree of shortage Ta_lack [Nm] (=Ta_req−Ta_poss) of the assist torque Ta_poss which can be output from the second rotary machine MG2 for the required assist torque Ta_req is great than when the degree of shortage Ta_lack is small. The assist torque Ta_poss which can be output from the second rotary machine MG2 can be estimated from the dischargeable electric power Wout in the battery 54 as described above, and the assist torque Ta_poss which can be output from the second rotary machine MG2 is estimated to be less when the dischargeable electric power Wout is small than when the dischargeable electric power Wout is great. Accordingly, the degree of shortage Ta_lack is greater when the dischargeable electric power Wout is small than when the dischargeable electric power Wout is great. Accordingly, the necessity to curb a supercharging response delay when the engine 12 is started is higher when the dischargeable electric power Wout is small than when the dischargeable electric power Wout is great.

Figure 9:
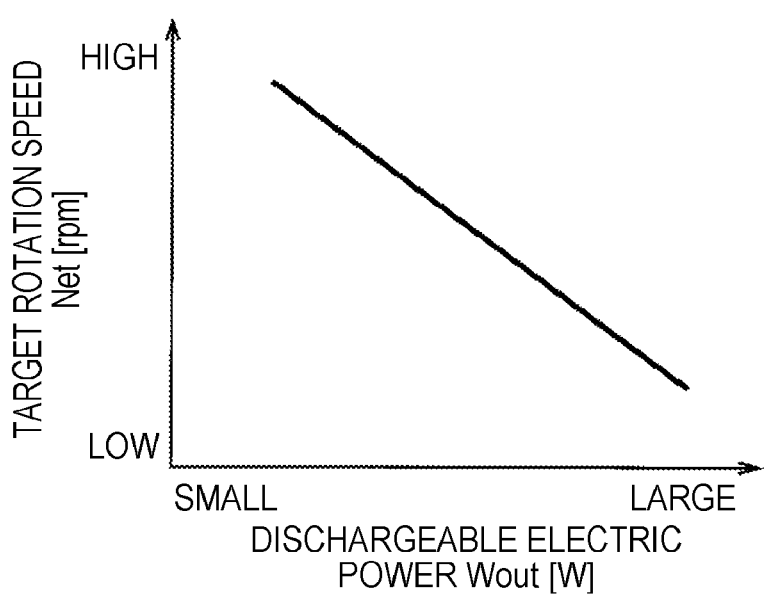
FIG. 9 is a diagram illustrating a relationship between a dischargeable electric power of a battery and the predetermined target rotation speed.

FIG. 9 is a diagram illustrating a relationship between the dischargeable electric power Wout and the predetermined target rotation speed Net in the battery 54. The predetermined target rotation speed Net is set to a greater value when the dischargeable electric power Wout is small than when the dischargeable electric power Wout is large. This means that, when conditions other than the dischargeable electric power Wout are the same (for example, when the intake-pipe pressure Pinh [%/ms] or acceleration request level Dacc is the same), the predetermined target rotation speed Net is set to a greater value when the dischargeable electric power Wout is small than when the dischargeable electric power Wout is great, but does not mean that, when conditions other than the dischargeable electric power Wout are different, the predetermined target rotation speed Net is necessarily set to a greater value when the dischargeable electric power Wout is small than when the dischargeable electric power Wout is great. In this way, the predetermined target rotation speed Net is set according to the degree of necessity to curb a supercharging response delay based on the dischargeable electric power Wout (that is, the degree of shortage Ta_lack).

As described above with reference to FIGS. 7 to 9, the target rotation speed setting unit 106 sets the predetermined target rotation speed Net using at least one of the intake-pipe pressure Pinh, the acceleration request level Dacc, and the dischargeable electric power Wout as a variable. That is, the target rotation speed setting unit 106 sets the predetermined target rotation speed Net based on the intake-pipe pressure Pinh, the acceleration request level Dacc, and the dischargeable electric power Wout. The acceleration request level Dacc is used as a variable to set the predetermined target rotation speed Net when an acceleration request is issued by the driver before the engine rotation speed Ne reaches the predetermined target rotation speed Net.

When the predetermined target rotation speed Net is set by the target rotation speed setting unit 106, the rotation speed increasing unit 108 increases the engine rotation speed Ne to the predetermined target rotation speed Net set by the target rotation speed setting unit 106 before the EV travel mode (the first travel mode) is switched to the HV travel mode (the second travel mode), that is, before the engine 12 is started. The rotation speed increasing unit 108 controls operation of the first rotary machine MG1 such that the engine rotation speed Ne is increased to the predetermined target rotation speed Net set by the target rotation speed setting unit 106 using the MG1 torque Tg when the state determining unit 104 determines that a braking operation is not performed by the driver. The rotation speed increasing unit 108 controls operation of the second rotary machine MG2 such that an increase or decrease of the drive torque Tw which is transmitted to the driving wheels 16 according to an increase or decrease of the MG1 torque Tg is cancelled (compensated for) by an increase or decrease of the MG2 torque Tm. Accordingly, a rapid increase or decrease of the drive torque Tw which is transmitted to the driving wheels 16 is curbed.

When the engine rotation speed Ne is increased to the predetermined target rotation speed Net by the rotation speed increasing unit 108, for example, the engine control unit 110 starts the engine 12 and the torque assist control unit 112 causes the second rotary machine MG2 to output the required assist torque Ta_req for compensating for the output shortage of the engine 12 due to the supercharging response delay in the supercharger 18. In this way, a direct engine-transmitted torque Td via the power transmission path PT out of the engine torque Te which is output from the engine 12 is mainly transmitted as the drive torque W to the driving wheels 16. The torque assist control unit 112 performs torque assist control which is control for compensating for a shortage of the direct engine-transmitted torque Td for the required drive torque Twdem based on the output shortage of the engine torque Te using the MG2 torque Tm which is output from the second rotary machine MG2 (the required assist torque Ta_req). When the engine rotation speed Ne is increased to the predetermined target rotation speed Net by the rotation speed increasing unit 108 before the engine 12 is started, the supercharging response delay when the engine 12 is started is curbed more than when the engine rotation speed Ne is not increased to the predetermined target rotation speed Net, and thus the required assist torque Ta_req for compensating for the output shortage of the engine 12 is decreased. Accordingly, the engine control unit 110 causes the second rotary machine MG2 to output the decreased required assist torque Ta_req. The operation of the first rotary machine MG1 is controlled such that a negative torque (a reaction torque) is generated, and generated electric power Wg of the first rotary machine MG1 is charged in the battery 54 or is consumed in the second rotary machine MG2.

Figure 10:
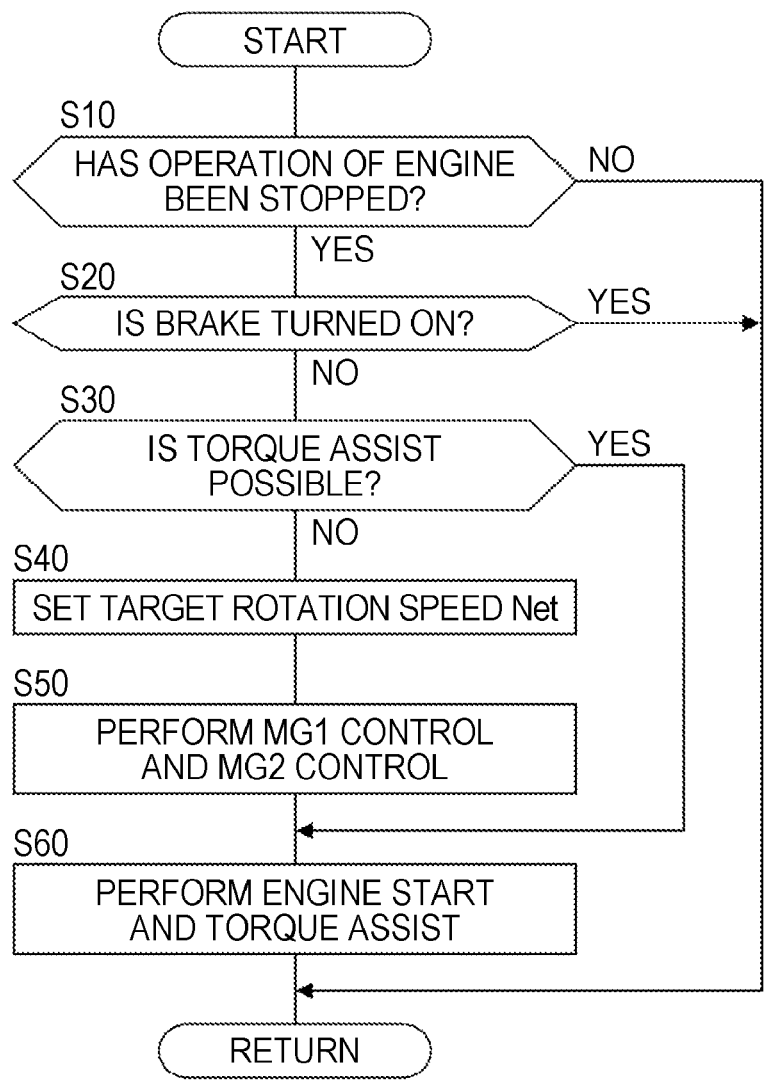
FIG. 10 is a diagram illustrating an example of a flowchart of a principal part of a control operation of an electronic control unit.

FIG. 10 is a diagram illustrating an example of a flowchart of a principal part of the control operation of the electronic control unit 100. FIG. 10 illustrates an example in which a predetermined target rotation speed Net is set based on the intake-pipe pressure Pinh and the dischargeable electric power Wout and the engine rotation speed Ne is increased to the predetermined target rotation speed Net before the engine 12 is started. The flowchart illustrated in FIG. 10 is repeatedly performed.

First, in Step S10 corresponding to the function of the engine determining unit 102, it is determined whether the operation of the engine 12 is stopped. When the determination result of Step S10 is positive, Step S20 is performed. When the determination result of Step S10 is negative, the flowchart is restarted.

In Step S20 corresponding to the function of the state determining unit 104, it is determined whether a braking operation is performed by a driver. When the determination result of Step S20 is positive, the flowchart is restarted. When the determination result of Step S20 is negative, Step S30 is performed.

In Step S30 corresponding to the function of the state determining unit 104, it is determined whether torque assist by the second rotary machine MG2 is possible, that is, whether the assist torque Ta_poss which can be output from the second rotary machine MG2 is sufficient for the required assist torque Ta_req. When the assist torque Ta_poss which can be output from the second rotary machine MG2 is sufficient for the required assist torque Ta_req (when the determination result of Step S30 is positive), it is determined that compensation for the output shortage of the engine 12 with the MG2 torque Tm is performed as much as necessary. When the assist torque Ta_poss which can be output from the second rotary machine MG2 is not sufficient for the required assist torque Ta_req (when the determination result of Step S30 is negative), it is determined that compensation for the output shortage of the engine 12 with the MG2 torque Tm is not performed as much as necessary. When the determination result of Step S30 is positive, Step S60 is performed. When the determination result of Step S30 is negative, Step S40 is performed.

In Step S40 corresponding to the function of the target rotation speed setting unit 106, the predetermined target rotation speed Net is set based on the intake-pipe pressure Pinh, the acceleration request level Dacc, and the dischargeable electric power Wout. Then, Step S50 is performed.

In Step S50 corresponding to the function of the rotation speed increasing unit 108, the engine rotation speed Ne is increased to the predetermined target rotation speed Net before the engine 12 is started by controlling the operation of the first rotary machine MG1. The operation of the second rotary machine MG2 is controlled such that an increase or decrease of the drive power torque Tw which is transmitted to the driving wheels 16 with an increase or decrease of the MG1 torque Tg is cancelled by an increase or decrease of the MG2 torque Tm. The dischargeable electric power Wout when Step S50 is performed is an electric power value with which the operation of the second rotary machine MG2 cannot be controlled such that the required assist torque Ta_req for compensating for the output shortage of the engine 12 due to the supercharging response delay when the engine 12 is started is output when the engine rotation speed Ne is not increased to the predetermined target rotation speed Net. However, the dischargeable electric power Wout when Step S50 is performed is an electric power value with which the operation of the first rotary machine MG1 can be controlled such that the engine rotation speed Ne is increased to the predetermined target rotation speed Net. Then, Step S60 is performed.

In Step S60 corresponding to the functions of the engine control unit 110 and the torque assist control unit 112, the engine 12 is started and the required assist torque Ta_req for compensating for the output shortage of the engine 12 due to the supercharging response delay in the supercharger 18 is output from the second rotary machine MG2. Then, the flowchart is restarted.

Figure 11:
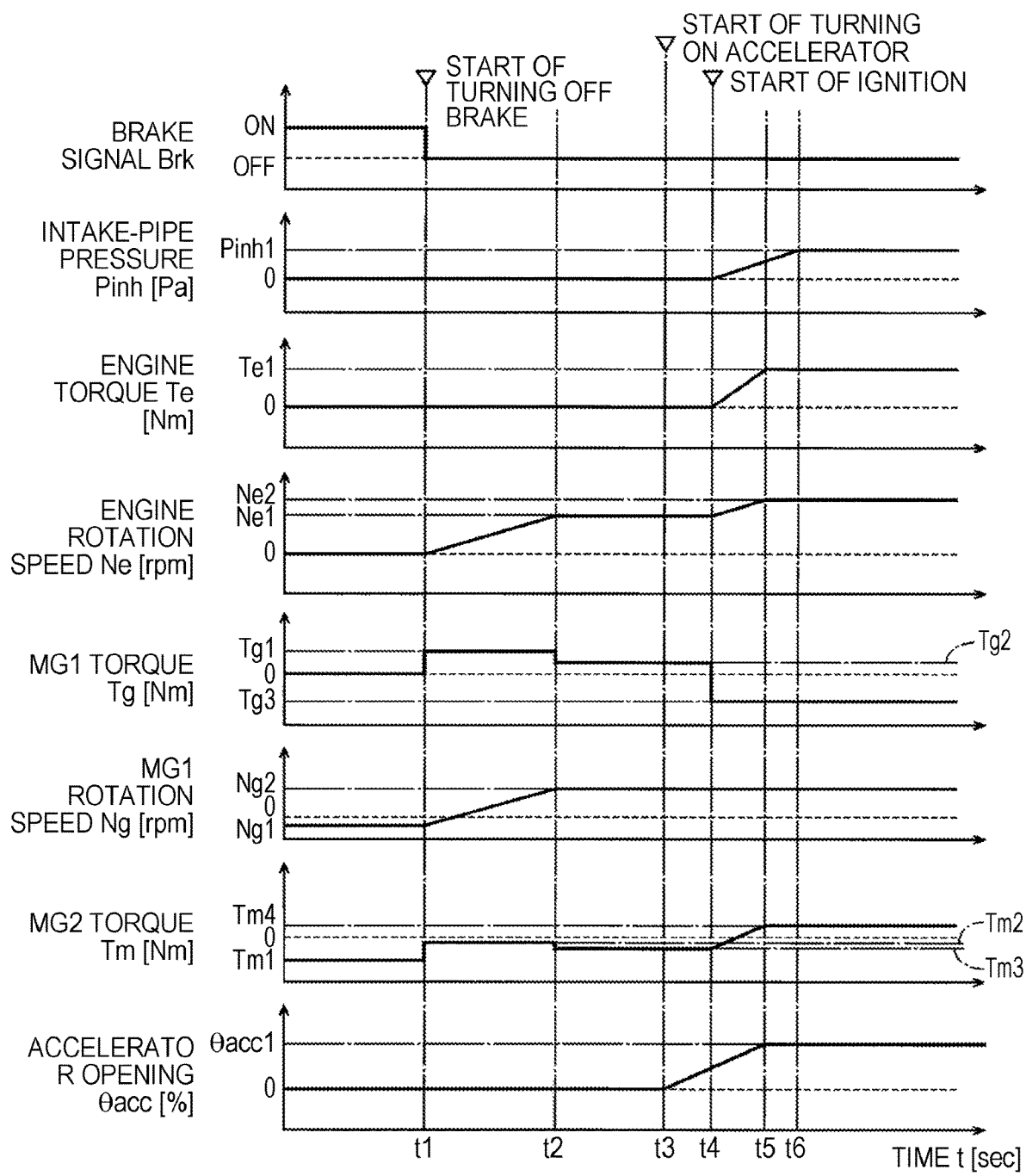
FIG. 11 is a diagram illustrating an example of a timing chart when the control operation of the electronic control unit illustrated in FIG. 10 is performed.

FIG. 11 is a diagram illustrating an example of a timing chart for when the control operation of the electronic control unit 100 illustrated in FIG. 10 is performed. FIG. 11 illustrates an example in which the vehicle 10 is switched from the EV travel mode (accurately, a travel state in which there is no drive power source for travel because the operation of the engine 12 is stopped and the second rotary machine MG2 performs regeneration) to the HV travel mode.

In FIG. 11, the horizontal axis represents time t [ms] and the vertical axis represents the brake signal Brk, the intake-pipe pressure Pinh, the engine torque Te, the engine rotation speed Ne, the MG1 torque Tg, the MG1 rotation speed Ng, the MG2 torque Tm, and the accelerator opening θacc sequentially from the top.

At a time before time t1, the brake signal Brk is in an ON state and the accelerator opening θacc is zero. Accordingly, the vehicle 10 is in a decelerating state. For example, in a state in which the second AT gear stage ("2nd" in FIG. 5) is formed according to the operating state of the vehicle 10, the brake signal Brk is in an ON state and the vehicle speed V decelerates to a low-speed state. The operation of the engine 12 is stopped, the engine rotation speed Ne is zero, and the engine torque Te is zero. The intake-pipe pressure Pinh is also zero (accurately, near atmospheric pressure). The MG1 torque Tg which may serve as a reaction torque for the engine 12 is zero, the MG2 torque Tm has a torque value Tm1 (<0) by regeneration, and the MG1 rotation speed Ng is a rotation speed value Ng1 (<0). In a range of time t in the timing chart illustrated in FIG. 11, the state in which the second AT gear stage is formed is maintained.

At time t1, the brake signal Brk is switched from the ON state to the OFF state by a braking operation which is performed by a driver. When the brake signal Brk is switched from the ON state to the OFF state, an acceleration request is predicted to be issued after time t1. At time t1, the MG1 torque Tg increases from zero to the torque value Tg1 (>0). The drive torque Tw which is transmitted to the driving wheels 16 decreases with the increase of the MG1 torque Tg. In order to curb a rapid increase or decrease of the drive torque Tw which is transmitted to the driving wheels 16 for the purpose of not changing the deceleration of the vehicle 10, the MG2 torque Tm is increased from the torque value Tm1 to the torque value Tm2 (Tm1<Tm2<0) such that the decrease of the drive torque Tw due to the increase of the MG1 torque Tg is cancelled. That is, a regenerative torque in the second rotary machine MG2 decreases.

In a period from time t1 to time t2 (>t1), the brake signal Brk is in the OFF state and the accelerator opening θacc is maintained at zero. The MG1 torque Tg is maintained at the torque value Tg1 and the MG2 torque Tm is maintained at the torque value Tm2. When the MG1 torque Tg reaches the torque value Tg1, the MG1 rotation speed Ng increases at a constant rate from the rotation speed value Ng1 to the rotation speed value Ng2 (>0), and the engine rotation speed Ne increases at a constant rate from zero to the rotation speed value Ne1 (>0). The rotation speed value Ne1 is the predetermined target rotation speed Net. Since the operation stopped state of the engine 12 is maintained, the engine torque Te is zero and the intake-pipe pressure Pinh is also maintained at zero.

At time t2, the engine rotation speed Ne reaches the rotation speed value Ne1 which is the predetermined target rotation speed Net. The MG1 torque Tg decreases from the torque value Tg1 to the torque value Tg2 (0<Tg2<Tg1). The drive torque Tw which is transmitted to the driving wheels 16 increases with the decrease of the MG1 torque Tg. In order to curb a rapid increase or decrease of the drive torque Tw which is transmitted to the driving wheels 16 for the purpose of not changing the deceleration of the vehicle 10, the MG2 torque Tm is decreased from the torque value Tm2 to the torque value Tm3 (Tm1<Tg3<Tm2<0) such that the increase of the drive torque Tw due to the decrease of the MG1 torque Tg is cancelled. That is, the regenerative torque in the second rotary machine MG2 is increased.

In a period from time t2 to time t3 (>t2), the brake signal Brk is in the OFF state and the accelerator opening θacc is maintained at zero. The MG1 torque Tg is maintained at the torque value Tg2 and the MG2 torque Tm is maintained at the torque value Tm3. When the MG1 torque Tg reaches the torque value Tg2, the MG1 rotation speed Ng is maintained at the rotation speed value Ng2 and the engine rotation speed Ne is maintained at the rotation speed value Ne1. Since the operation stopped state of the engine 12 is maintained, the engine torque Te is zero and the intake-pipe pressure Pinh is also maintained at zero.

In a period from time t3 to time t5 (>t3), the accelerator opening θacc is increased from zero to an opening value θacc1, for example, through an operation of a driver increasing a force of depression of an accelerator pedal.

At time t4 between time t3 and time t5 (t3<t4<t5), engine ignition is started and the engine 12 is started. The MG1 torque Tg is changed from the torque value Tg2 to the torque value Tg3 (<0) and becomes a negative torque (a reaction torque).

In a period from time t3 to time t4, the brake signal Brk, the intake-pipe pressure Pinh, the engine torque Te, the engine rotation speed Ne, the MG1 torque Tg, the MG1 rotation speed Ng, and the MG2 torque Tm are the same as those in the period from time t2 to time t3.

In a period from time t4 to time t5, the engine rotation speed Ne is increased from the rotation speed value Ne1 to the rotation speed Ne2 by starting of the engine 12, and the engine torque Te is increased from zero to the torque value Te1 (>0). The MG1 torque Tg is maintained at the torque value Tg3 and the MG1 rotation speed Ng is maintained at the rotation speed value Ng2. The MG2 torque Tm is increased from the torque value Tm3 to the torque value Tm4 (Tm4>0>Tm3) such that the output shortage of the engine 12 due to the supercharging response delay in the supercharger 18 is compensated for. The torque value Tm4 is the required assist torque Ta_req for compensating for the output shortage of the engine 12 which is decreased by curbing the supercharging response delay. The intake-pipe pressure Pinh is gradually increased from zero by starting of the engine 12.

After time t5, the brake signal Brk, the engine torque Te, the engine rotation speed Ne, the MG1 torque Tg, the MG1 rotation speed Ng, the MG2 torque Tm, and the accelerator opening θacc are maintained at the values at time t5.

The intake-pipe pressure Pinh increasing at time t4 increases to a pressure value Pinh1 (a target supercharging pressure Pchgtgt) at time t6 (>t5). After time t6, the intake-pipe pressure Pinh (the supercharging pressure Pchg) is maintained in the state at time t6.

According to this embodiment, the control device for a hybrid vehicle includes: (a) the torque assist control unit 112 configured to cause the second rotary machine MG2 to output a required assist torque Ta_req for compensating for an output shortage of the engine 12 due to a supercharging response delay in the supercharger 18 when the EV travel mode in which the engine 12 is not used as a drive power source for travel is switched to the HV travel mode in which at least the engine 12 is used as a drive power source for travel in response to an acceleration request from a driver; (b) the state determining unit 104 configured to determine whether an assist torque Ta_poss which is able to be output from the second rotary machine MG2 is sufficient for the required assist torque Ta_req; and (c) the rotation speed increasing unit 108 configured to increase the engine rotation speed Ne to a predetermined target rotation speed Net before the EV travel mode is switched to the HV travel mode (before the engine 12 is started) when the state determining unit 104 determines that the assist torque Ta_poss which is able to be output from the second rotary machine MG2 is not sufficient for the required assist torque Ta_req during travel in the EV travel mode. Accordingly, by increasing the engine rotation speed Ne to the predetermined target rotation speed Net, it is possible to curb a supercharging response delay in the supercharger 18 and to curb a decrease in acceleration responsiveness due to a shortage of an assist torque when the assist torque Ta_poss which is able to be output from the second rotary machine MG2 is not sufficient for the required assist torque Ta_req.

According to this embodiment, the control device for a hybrid vehicle further includes the target rotation speed setting unit 106 configured to set the predetermined target rotation speed Net, and the target rotation speed setting unit 106 is configured to set the predetermined target rotation speed Net to a greater value when an intake-pipe pressure Pinh of the engine 12 is low than when the intake-pipe pressure Pinh is high based on the intake-pipe pressure Pinh. Since the supercharging response delay when the engine 12 is started is more likely to increase when the intake-pipe pressure Pinh is low than when the intake-pipe pressure Pinh is high, there is a high degree of necessity to curb the supercharging response delay. By setting the predetermined target rotation speed Net to a higher value when the intake-pipe pressure Pinh is low than when the intake-pipe pressure Pinh is high, the supercharging response delay is curbed according to the degree of necessity to curb the supercharging response delay and thus it is possible to prevent an unnecessary increase of the engine rotation speed Ne.

According to this embodiment, the control device for a hybrid vehicle further includes the target rotation speed setting unit 106 configured to set the predetermined target rotation speed Net, and the target rotation speed setting unit 106 is configured to set the predetermined target rotation speed Net to a greater value when an acceleration request level Dacc from the driver is great than when the acceleration request level Dacc is small based on the acceleration request level Dacc. Since the driver is considered to require more rapid acceleration when the acceleration request level Dacc from the driver is high than when the acceleration request level Dacc is low, there is a high degree of necessity to curb the supercharging response delay. By setting the target rotation speed Net to a higher value when the acceleration request level Dacc is high than when the acceleration request level Dacc is low, the supercharging response delay is curbed according to the degree of necessity to curb the supercharging response delay and thus it is possible to prevent an unnecessary increase of the engine rotation speed Ne.

According to this embodiment, the control device for a hybrid vehicle further includes the target rotation speed setting unit 106 configured to set the predetermined target rotation speed Net, and the target rotation speed setting unit 106 is configured to set the predetermined target rotation speed Net to a greater value when a degree of shortage Ta_lack of the assist torque Ta_poss which is able to be output from the second rotary machine MG2 for the required assist torque Ta_req is great than when the degree of shortage Ta_lack is small based on the degree of shortage Ta_lack. When the degree of shortage Ta_lack is high, the degree of necessity to curb the supercharging response delay when the engine 12 is started is higher than when the degree of shortage Ta_lack is low. By setting the predetermined target rotation speed Net to a higher value when the degree of shortage Ta_lack is high than when the degree of shortage Ta_lack is low, the supercharging response delay is curbed according to the degree of necessity to curb the supercharging response delay and thus it is possible to prevent an unnecessary increase of the engine rotation speed Ne.

According to this embodiment, (a) the state determining unit 104 is configured to determine whether a braking operation is performed by the driver, and (b) the rotation speed increasing unit 108 is configured to increase the engine rotation speed Ne to the predetermined target rotation speed Net when the state determining unit 104 determines that the braking operation is not performed by the driver. When a braking operation is performed, the engine 12 is not started. Accordingly, it is possible to prevent an unnecessary increase of the engine rotation speed Ne in a state in which the engine 12 is not started.

Figure 12:
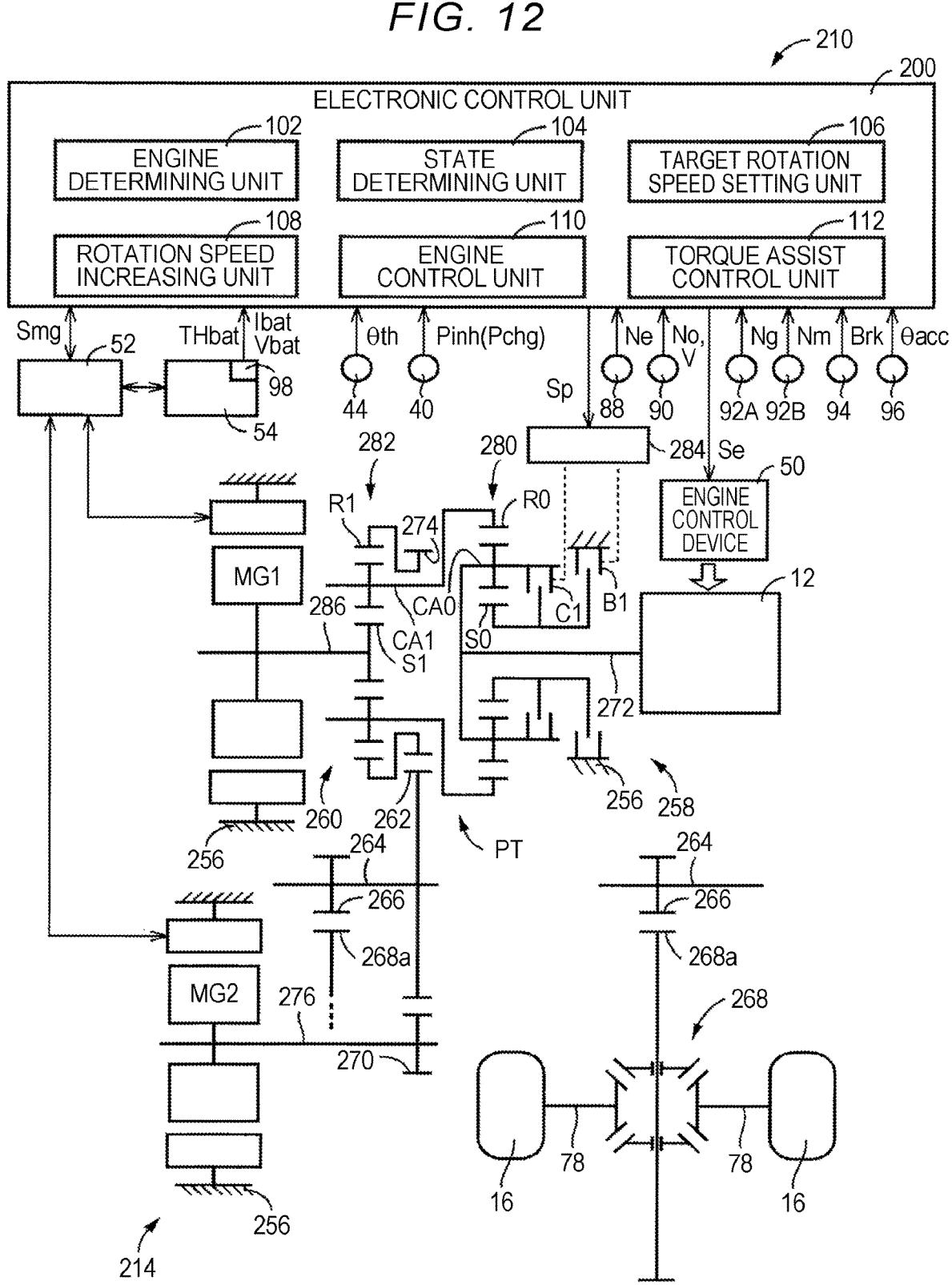
FIG. 12 is a functional block diagram schematically illustrating a configuration of a vehicle in which an electronic control unit according to a second embodiment of the disclosure is mounted and illustrating a principal part of a control function for various types of control in the vehicle.

FIG. 12 is a functional block diagram schematically illustrating a configuration of a hybrid vehicle 210 in which an electronic control unit 200 according to a second embodiment of the disclosure is mounted and illustrating a principal part of a control function for various types of control in the hybrid vehicle 210. The hybrid vehicle 210 (hereinafter referred to as a "vehicle 210") includes an engine 12, a first rotary machine MG1, a second rotary machine MG2, a power transmission device 214, and driving wheels 16. Elements of the second embodiment which are substantially common to the functions of the first embodiment will be referred to by the same reference signs and description thereof will not be repeated.

An engine torque Te of the engine 12 is controlled by causing an electronic control unit 200 which will be described later to control an engine control device 50 which is provided in the vehicle 210.

The power transmission device 214 includes a gear shifting unit 258, a differential unit 260, a driven gear 262, a driven shaft 264, a final gear 266, a differential gear 268, and a reduction gear 270 in a case 256. The gear shifting unit 258 and the differential unit 260 are arranged coaxially with an input shaft 272 which is an input rotary member of the gear shifting unit 258. The gear shifting unit 258 is connected to the engine 12 via the input shaft 272 or the like. The differential unit 260 is connected in series to the gear shifting unit 258. The driven gear 262 engages with a drive gear 274 which is an output rotary member of the differential unit 260. The driven shaft 264 fixes the driven gear 262 and the final gear 266 such that they cannot rotate relative to each other. The final gear 266 has a smaller diameter than the driven gear 262. The differential gear 268 engages with the final gear 266 via a differential ring gear 268a. The reduction gear 270 has a smaller diameter than the driven gear 262 and engages with the driven gear 262. A rotor shaft 276 of the second rotary machine MG2 which is disposed in parallel to the input shaft 272 is connected to the reduction gear 270 separately from the input shaft 272, and the second rotary machine MG2 is connected to the driven gear 262 in a power-transmittable manner. The power transmission device 214 includes axles 78 that are connected to the differential gear 268.

The power transmission device 214 having this configuration is suitably used for a vehicle of a front-engine/front-drive (FF) type or a rear-engine/rear-drive (RR) type. In the power transmission device 214, power which is output from the engine 12, the first rotary machine MG1, and the second rotary machine MG2 is transmitted to the driven gear 262. The power transmitted to the driven gear 262 is transmitted to the driving wheels 16 sequentially via the final gear 266, the differential gear 268, the axles 78, and the like. The gear shifting unit 258, the differential unit 260, the driven gear 262, the driven shaft 264, the final gear 266, the differential gear 268, and the axles 78 in the power transmission device 214 constitute a power transmission path PT which is provided between the engine 12 and the driving wheels 16. In this way, the second rotary machine MG2 is connected to the power transmission path PT via the reduction gear 270 in a power-transmittable manner, and the second rotary machine MG2 is connected to the driving wheels 16 in a power-transmittable manner.

The gear shifting unit 258 includes a first planetary gear mechanism 280, a clutch C1, and a brake B1. The first planetary gear mechanism 280 is a known single-pinion type planetary gear device including a sun gear S0, a carrier CA0, and a ring gear R0. The differential unit 260 includes a second planetary gear mechanism 282. The second planetary gear mechanism 282 is a known single-pinion type planetary gear device including a sun gear S1, a carrier CA1, and a ring gear R1.

In the clutch C1 and the brake B1, operating states such as an engaged state and a disengaged state are switched based on regulated hydraulic pressures which are output from a hydraulic pressure control circuit 284 by causing the electronic control unit 200 which will be described later to control the hydraulic pressure control circuit 284 provided in the vehicle 210.

The first planetary gear mechanism 280, the second planetary gear mechanism 282, the clutch C1, and the brake B1 are connected as illustrated in FIG. 12.

In a state in which both the clutch C1 and the brake B1 are disengaged, a differential motion of the first planetary gear mechanism 280 is permitted. In this state, since a reaction torque of the engine torque Te does not appear in the sun gear S0, the gear shifting unit 258 is in a neutral state in which mechanical power transmission is not possible, that is, a neutral state. In a state in which the clutch C1 is engaged and the brake B1 is disengaged, the rotary elements of the first planetary gear mechanism 280 rotate integrally. In this state, rotation of the engine 12 is transmitted from the ring gear R0 to the carrier CA1 at a constant speed. On the other hand, in a state in which the clutch C1 is disengaged and the brake B1 is engaged, rotation of the sun gear S0 of the first planetary gear mechanism 280 is prohibited and rotation of the ring gear R0 is increased to be higher than rotation of the carrier CA0. In this state, the rotation of the engine 12 is increased and is output from the ring gear R0.

In this way, the gear shifting unit 258 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 280 is prohibited. In this state, rotation of the ring gear R0 which is an output rotary member of the gear shifting unit 258 is stopped and thus rotation of the carrier CA1 which is an input rotary member of the differential unit 260 is stopped.

In the second planetary gear mechanism 282, the carrier CA1 is a rotary element that is connected to the ring gear R0 which is an output rotary member of the gear shifting unit 258 and serves as an input rotary member of the differential unit 260. The sun gear S1 is a rotary element that is integrally connected to a rotor shaft 286 of the first rotary machine MG1 and is connected to the first rotary machine MG1 in a power-transmittable manner. The ring gear R1 is a rotary element that is integrally connected to the drive gear 274 and is connected to the driving wheels 16 in a power-transmittable manner, and serves as an output rotary member of the differential unit 260.

The second planetary gear mechanism 282 is a power split mechanism that mechanically splits power of the engine 12 which is input to the carrier CA1 via the gear shifting unit 258 to the first rotary machine MG1 and the drive gear 274. That is, the second planetary gear mechanism 282 is a differential mechanism that splits and transmits the power of the engine 12 to the driving wheels 16 and the first rotary machine MG1. In the second planetary gear mechanism 282, the carrier CA1 serves as an input element, the sun gear S1 serves as a reaction element, and the ring gear R1 serves as an output element. The differential unit 260 constitutes an electric gear shifting mechanism, for example, an electric stepless transmission, in which a differential state of the second planetary gear mechanism 282 (that is, a differential state of that differential unit 260) is controlled by controlling the operating state of the first rotary machine MG1 that is connected to the second planetary gear mechanism 282 in a power-transmittable manner. The differential unit 260 which is a stepless transmission is provided in the power transmission path PT. The first rotary machine MG1 is a rotary machine to which the power of the engine 12 is transmitted. Since the gear shifting unit 258 is in an overdrive state, an increase in torque of the first rotary machine MG1 is curbed.

FIG. 13 is an engagement operation table illustrating a relationship between travel modes and combinations of operating states of the clutch C1 and the brake B1 which are used therein. In FIG. 13, "O" denotes an engaged state, a blank denotes a disengaged state, and "Δ" denotes that one of the clutch C1 and the brake B1 is engaged at the time of use in combination with an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including a single-motor-driven EV travel mode and a double-motor-driven EV travel mode. The EV travel mode in this embodiment corresponds to a "first travel mode" in the claims.

The single-motor-driven EV travel mode is a travel mode in which the engine 12 is not used as a drive power source for travel and only the second rotary machine MG2 is used as a drive power source for travel. The single-motor-driven EV travel mode is realized in a state in which both the clutch C1 and the brake B1 are disengaged. In the single-motor-driven EV travel mode, the clutch C1 and the brake B1 are disengaged and thus the gear shifting unit 258 falls into a neutral state. When the gear shifting unit 258 is in the neutral state, the differential unit 260 falls into a neutral state in which a reaction torque of the MG1 torque Tg does not appear in the carrier CA1 connected to the ring gear R0. In this state, the electronic control unit 200 causes the second rotary machine MG2 to output the MG2 torque Tm for travel. In the single-motor-driven EV travel mode, reverse travel may be performed by rotating the second rotary machine MG2 oppositely to the rotating direction at the time of forward travel.

In the single-motor-driven EV travel mode, since the ring gear R0 is corotated with the carrier CA1 but the gear shifting unit 258 is in the neutral state, the engine 12 is not corotated but is stopped with zero rotation. Accordingly, when regeneration control is performed in the second rotary machine MG2 during travel in the single-motor-driven EV travel mode, it is possible to take a large amount of regenerated electric power.

Use in combination with an engine brake is considered at the time of travel in the single-motor-driven EV travel mode. When the engine brake is used together, the brake B1 or the clutch C1 is engaged (see "use in combination with engine brake" in FIG. 13). When the brake B1 or the clutch C1 is engaged, the engine 12 is corotated and the engine brake operates. In the single-motor-driven EV travel mode using the engine brake together, control can be performed such that the engine rotation speed Ne increases to a predetermined target rotation speed Net before the engine 12 is started by controlling drive of the first rotary machine MG1.

The double-motor-driven EV travel mode is a travel mode in which both the first rotary machine MG1 and the second rotary machine MG2 are used as drive power sources for travel. The double-motor-driven EV travel mode is realized in a state in which both the clutch C1 and the brake B1 are engaged. In the double-motor-driven EV travel mode, since the clutch C1 and the brake B1 are engaged, rotation of the rotary elements of the first planetary gear mechanism 280 is stopped, the engine 12 is stopped with zero rotation, and rotation of the carrier CA1 connected to the ring gear R0 is stopped. When the rotation of the carrier CA1 is stopped, a reaction torque of the MG1 torque Tg appears in the carrier CA1, and thus the MG1 torque Tg can be mechanically output from the ring gear R1 and be transmitted to the driving wheels 16. In this state, the electronic control unit 200 causes the first rotary machine MG1 and the second rotary machine MG2 to output the MG1 torque Tg and the MG2 torque Tm for travel. In the double-motor-driven EV travel mode, both the first rotary machine MG1 and the second rotary machine MG2 can be rotated oppositely to the rotating direction at the time of forward travel to allow reverse travel.

The HV travel mode is a travel mode in which at least the engine 12 is used as a drive power source for travel. A low state of the HV travel mode is realized in a state in which the clutch C1 is engaged and the brake B1 is disengaged. In the low state of the HV travel mode, since the clutch C1 is engaged, the rotary elements of the first planetary gear mechanism 280 are integrally rotated and the gear shifting unit 258 falls into a directly coupled state. Accordingly, rotation of the engine 12 is transmitted from the ring gear R0 to the carrier CA1 at a constant speed. A high state of the HV travel mode is realized in a state in which the brake B1 is engaged and the clutch C1 is disengaged. In the high state of the HV travel mode, since the brake B1 is engaged, rotation of the sun gear S0 is stopped and the gear shifting unit 258 falls into an overdrive state. Accordingly, rotation of the engine 12 increases and is transmitted from the ring gear R0 to the carrier CA1. In the HV travel mode, the electronic control unit 200 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1. In the HV travel mode, for example, in the low state of the HV travel mode, the second rotary machine MG2 can also be rotated oppositely to the rotating direction at the time of forward travel to allow reverse travel. In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up. The HV travel mode in this embodiment is a travel mode in which at least the engine 12 is used as a drive power source for travel and corresponds to a "second travel mode" in the claims.

The vehicle 210 further includes the electronic control unit 200 which is a controller including a control device for the vehicle 210 associated with control of the engine 12, the first rotary machine MG1, the second rotary machine MG2, and the like. The electronic control unit 200 has the same configuration as the electronic control unit 100 described above in the first embodiment. The electronic control unit 200 is supplied with various signals which are the same as those supplied to the electronic control unit 100 (the rotation speed of the drive gear 274 constrained on the rotation of the driving wheels 16 is detected and input as an output rotation speed No [rpm] by the output rotation speed sensor 90 in this embodiment). Various command signals which are the same as those output from the electronic control unit 100 are output from the electronic control unit 200. The electronic control unit 200 has the same functions as the functions of the engine determining unit 102, the state determining unit 104, the target rotation speed setting unit 106, the rotation speed increasing unit 108, the engine control unit 110, and the torque assist control unit 112 similarly to the electronic control unit 100. The electronic control unit 200 corresponds to a "control device" in the claims.

The control operation of the electronic control unit 200 is substantially the same as the electronic control unit 100 in the first embodiment, except that the rotation speed increasing unit 108 increases the engine rotation speed Ne to a predetermined target rotation speed Net before the engine 12 is started when the travel mode is switched from the single-motor-driven EV travel mode in which the engine brake is used together to the HV travel mode and the state determining unit 104 determines that the assist torque Ta_poss which can be output from the second rotary machine MG2 is not sufficient for the required assist torque Ta_req. The others are the same and thus description thereof will not be repeated.

According to this embodiment, since the engine rotation speed Ne is increased to the predetermined target rotation speed Net when the EV travel mode is switched to the HV travel mode, the same advantages as in the first embodiment such as curbing the supercharging response delay in the supercharger 18 and curbing a decrease in acceleration responsiveness due to an assist torque shortage when the assist torque Ta_poss which is able to be output from the second rotary machine MG2 is not sufficient for the required assist torque Ta_req can be achieved.

While embodiments of the disclosure have been described above in detail with reference to the accompanying drawings, the disclosure can be applied to other aspects.

In the first and second embodiments described above, the predetermined target rotation speed Net is set using at least one of three including the intake-pipe pressure Pinh, the acceleration request level Dacc, and the dischargeable electric power Wout as a variable, but the disclosure is not limited thereto. For example, the predetermined target rotation speed Net may be set using a parameter other than the three parameters as a variable, or a predetermined value which is acquired by experiment or design and stored in advance may be set as the predetermined target rotation speed Net. The predetermined target rotation speed Net is set to a value with which the engine rotation speed Ne increases before the EV travel mode (the first travel mode) is switched to the HV travel mode (the second travel mode).

In the first and second embodiments, the predetermined target rotation speed Net is set to a greater value when the intake-pipe pressure Pinh is low than when the intake-pipe pressure Pinh is high and the engine rotation speed Ne is increased to the predetermined target rotation speed Net, but the engine rotation speed Ne may not be necessarily increased. For example, when the intake-pipe pressure Pinh is sufficiently high, the supercharging response delay is small, and it is determined that the acceleration responsiveness when the engine 12 is started is good, control for increasing the engine rotation speed Ne to the predetermined target rotation speed Net may not be performed.

In the first and second embodiment, when the brake signal Brk is switched from the ON state to the OFF state, the state determining unit 104 determines that a braking operation is not performed by a driver and the rotation speed increasing unit 108 increases the engine rotation speed Ne to the predetermined target rotation speed Net, but the disclosure is not limited thereto. For example, in the first embodiment, when the accelerator pedal depressed by a driver is restored in a state in which the vehicle 10 is traveling in the EV travel mode, the vehicle speed V is in a middle-high-speed state, and the brake signal Brk is maintained in the OFF state, an acceleration request may be predicted to be issued thereafter. Accordingly, a configuration in which the rotation speed increasing unit 108 increases the engine rotation speed Ne to the predetermined target rotation speed Net may be employed in this case. An example of this case is a case in which the accelerator opening θacc decreases rapidly from a state in which the accelerator opening θacc is equal to or greater than a predetermined opening value to zero or the vicinity of zero which is a state in which the accelerator opening θacc is less than the predetermined opening value. The predetermined opening value is a predetermined threshold value for determining that an acceleration request is not issued.

In the first and second embodiment, the rotation speed increasing unit 108 increases the engine rotation speed Ne to the predetermined target rotation speed Net before the engine 12 is started (accurately before engine ignition is started), but the disclosure is not limited thereto. For example, the rotation speed increasing unit 108 may start control for increasing the engine rotation speed Ne before engine ignition is started and then increase the engine rotation speed Ne to reach the predetermined target rotation speed Net until an engine torque Te which is drive power for travel is output from the engine 12 after the engine ignition has been started. The case in which "the rotation speed of the engine is increased to the predetermined target rotation speed before the first travel mode is switched to the second travel mode" in the claims includes a case in which the engine rotation speed Ne is increased to reach the predetermined target rotation speed Net before the engine torque Te is output in this way.

In the first and second embodiments, an example of the case in which the predetermined target rotation speed Net is set to a greater value when the degree of shortage Ta_lack is great than when the degree of shortage Ta_lack is small is described to be a case in which the predetermined target rotation speed Net is set to a greater value when the dischargeable electric power Wout is small than when the dischargeable electric power Wout is great, but the disclosure is not limited thereto.

In the first and second embodiments, when the engine 12 is started in a state in which the engine rotation speed Ne is increased to the predetermined target rotation speed Net to curb the supercharging response delay before the engine 12 is started, the required assist torque Ta_req is output from the second rotary machine MG2, but the required assist torque Ta_req may not be necessarily output from the second rotary machine MG2. For example, when the required assist torque Ta_req becomes zero or a value close to zero by increasing the engine rotation speed Ne to the predetermined target rotation speed Net to curb the supercharging response delay before the engine 12 is started, the required assist torque Ta_req may not be output from the second rotary machine MG2. This is because an output shortage of the engine 12 due to the supercharging response delay in the supercharger 18 is supplemented by curbing the supercharging response delay and the decrease in acceleration responsiveness is curbed even when the required assist torque Ta_req is not output from the second rotary machine MG2.

In the first and second embodiments, when the vehicle 10 or 210 can select a normal mode, a sport mode (or a power mode), and an echo mode as a driving mode, the disclosure may be applied to a case in which the normal mode and the echo mode are selected, and the disclosure may not be applied to a case in which the sport mode is selected because the engine 12 is maintained in an autonomously operating state (a state in which fuel is supplied to the engine 12 and engine ignition is performed). The normal mode is, for example, a predetermined driving mode in which a vehicle can travel with high fuel efficiency while providing power performance. The sport mode is a predetermined driving mode in which the vehicle can travel with priority given to power performance rather than fuel-efficiency performance in comparison with the normal mode. The echo mode is a predetermined driving mode in which the vehicle can travel with priority given to fuel-efficiency performance rather than power performance in comparison with the normal mode.

In the first and second embodiment, a decrease in acceleration responsiveness is curbed by increasing the engine rotation speed Ne to the predetermined target rotation speed Net before the engine 12 is started and thus curbing a supercharging response delay at the time of forward travel, but the disclosure can be applied to reverse travel.

In the first embodiment, the one-way clutch F0 is exemplified as a lock mechanism that can fix the carrier CA1 in a non-rotatable manner, but the disclosure is not limited to this aspect. This lock mechanism may be an engagement device such as a dog clutch, a hydraulic frictional engagement device such as a clutch or a brake, a dry engagement device, an electromagnetic frictional engagement device, or a magnetic powder type clutch which selectively connects the input shaft 72 and the case 56. Alternatively, the vehicle 10 does not have to include the one-way clutch F0.

In the second embodiment, the vehicle 210 may be a vehicle which does not include the gear shifting unit 258 and in which the engine 12 is connected to the differential unit 260. The differential unit 260 may be a mechanism in which a differential operation can be limited by control of a clutch or brake connected to the rotary elements of the second planetary gear mechanism 282. The second planetary gear mechanism 282 may be a double pinion type planetary gear unit. The second planetary gear mechanism 282 may be a differential mechanism including four or more rotary elements by connection between a plurality of planetary gear units. The second planetary gear mechanism 282 may be a differential gear mechanism in which the first rotary machine MG1 and the drive gear 274 are connected to a pinion which is rotationally driven by the engine 12 and a pair of bevel gears engaging with the pinion, respectively. The second planetary gear mechanism 282 may be a mechanism with a configuration in which some rotary elements of two or more planetary gear units are connected to each other and the engine 12, the first rotary machine MG1, and the driving wheels 16 are connected to the rotary elements of such planetary gear units in a power-transmittable manner.

In the first and second embodiments, the supercharger 18 is a known exhaust turbine type supercharger, but the disclosure is not limited to this aspect. For example, the supercharger 18 may be a mechanical pump type supercharger that is rotationally driven by the engine or the electric motor. An exhaust turbine type supercharger and a mechanical pump type supercharger may be provided together as a supercharger.

In the first and second embodiments, the EV travel mode is described above to correspond to a "first travel mode" in the claims, but a travel mode in which none of the engine 12, the first rotary machine MG1, and the second rotary machine MG2 is used as a drive power source for travel corresponds to a "first travel mode" in the claims.

The embodiments described above are merely examples of the disclosure, and the disclosure can be embodied in various aspects which have been subjected to various modifications and improvements based on knowledge of those skilled in the art without departing from the gist of the disclosure.

What is claimed is:

1. A control device for a hybrid vehicle including an engine with a supercharger and a rotary machine and using power which is output from the engine and the rotary machine as drive power for travel, the control device comprising:
    a torque assist control unit configured to cause the rotary machine to output a required assist torque for compensating for an output shortage of the engine due to a supercharging response delay in the supercharger when a travel mode is switched from a first travel mode in which the engine is not used as a drive power source for travel to a second travel mode in which at least the engine is used as a drive power source for travel in response to an acceleration request from a driver;
    a state determining unit configured to determine whether an assist torque which is able to be output from the rotary machine is sufficient for the required assist torque; and
    a rotation speed increasing unit configured to increase a rotation speed of the engine to a predetermined target rotation speed before the first travel mode is switched to the second travel mode when the state determining unit determines that the assist torque which is able to be output from the rotary machine is not sufficient for the required assist torque during travel in the first travel mode.

2. The control device for a hybrid vehicle according to claim 1, further comprising a target rotation speed setting unit configured to set the target rotation speed,
    wherein the target rotation speed setting unit is configured to set the target rotation speed to a greater value when an intake-pipe pressure of the engine is low than when the intake-pipe pressure is high based on the intake-pipe pressure.

3. The control device for a hybrid vehicle according to claim 1, further comprising a target rotation speed setting unit configured to set the target rotation speed,
    wherein the target rotation speed setting unit is configured to set the target rotation speed to a greater value when an acceleration request level from the driver is great than when the acceleration request level is small based on the acceleration request level.

4. The control device for a hybrid vehicle according to claim 1, further comprising a target rotation speed setting unit configured to set the target rotation speed,
   wherein the target rotation speed setting unit is configured to set the target rotation speed to a greater value when a degree of shortage of the assist torque which is able to be output from the rotary machine for the required assist torque is great than when the degree of shortage is small based on the degree of shortage.

5. The control device for a hybrid vehicle according to claim 1, wherein the state determining unit is configured to further determine whether a braking operation is performed by the driver, and
   wherein the rotation speed increasing unit is configured to increase the rotation speed of the engine to the target rotation speed when the state determining unit determines that the braking operation is not performed by the driver.

* * * * *